(12) United States Patent
Li et al.

(10) Patent No.: US 11,057,619 B2
(45) Date of Patent: Jul. 6, 2021

(54) IMAGE CODING METHOD AND APPARATUS BASED ON INTRA PREDICTION USING MPM LIST

(71) Applicant: LG Electronics Inc., Seoul (KR)

(72) Inventors: Ling Li, Seoul (KR); Jaehyun Lim, Seoul (KR); Jin Heo, Seoul (KR); Jangwon Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/868,768

(22) Filed: May 7, 2020

(65) Prior Publication Data

US 2020/0304780 A1    Sep. 24, 2020

Related U.S. Application Data

(63) Continuation of application No. PCT/KR2020/003921, filed on Mar. 23, 2020.
(Continued)

(51) Int. Cl.
*H04N 11/02*    (2006.01)
*H04N 19/105*   (2014.01)
(Continued)

(52) U.S. Cl.
CPC ......... *H04N 19/105* (2014.11); *H04N 19/159* (2014.11); *H04N 19/176* (2014.11)

(58) Field of Classification Search
CPC ... H04N 19/105; H04N 19/159; H04N 19/176
(Continued)

(56) References Cited

U.S. PATENT DOCUMENTS

2014/0226912 A1*  8/2014  Lee ................... H04N 19/107
                                                          382/238
2016/0373782 A1  12/2016  Zhao et al.
(Continued)

FOREIGN PATENT DOCUMENTS

| KR | 1020180008797 A | 1/2018 |
| KR | 101822474 B1 | 3/2018 |
| KR | 1020180123674 A | 11/2018 |

OTHER PUBLICATIONS

Sharp Electronics of Canada, Sharp Labs of America, "CE3-3.4.1, CE3-3.4.2, CE3-3.4.3: Results for unified MPM list construction process", FP Joint Video Experts Team (JVET) of ITU-T SG 16 WP 3 and ISO/IEC JTC 1/SC 29/WG 11, Mar. 19-27, 2019, JVET-N0436.
(Continued)

*Primary Examiner* — Jayanti K Patel
*Assistant Examiner* — Richard B Carter
(74) *Attorney, Agent, or Firm* — Dentons US LLP

(57) ABSTRACT

An image decoding method performed by a decoding apparatus according to the present disclosure includes receiving intra prediction information including at least one of most probable mode (MPM) flag information representing whether to derive an intra prediction mode for a current block based on MPM candidates for the current block or planar flag information representing whether to determine the intra prediction mode for the current block as a planar mode, deriving the intra prediction mode for the current block based on the MPM flag information and the planar flag information, deriving a predicted block for the current block based on the intra prediction mode for the current block, and generating a reconstructed picture based on the predicted block.

20 Claims, 49 Drawing Sheets

Related U.S. Application Data

(60) Provisional application No. 62/822,874, filed on Mar. 23, 2019.

(51) Int. Cl.
 H04N 19/176 (2014.01)
 H04N 19/159 (2014.01)

(58) Field of Classification Search
 USPC .................. 375/240.02, 240.12; 382/238
 See application file for complete search history.

(56) References Cited

U.S. PATENT DOCUMENTS

2018/0332284 A1 11/2018 Liu et al.
2019/0149821 A1* 5/2019 Moon .................... H04N 19/70
 375/240.02
2020/0021851 A1* 1/2020 Zhao .................... H04N 19/105

OTHER PUBLICATIONS

Feng Zou et al., "Planar Mode Mapping for Intra Mode Coding", Joint Collaborative Team on Video Coding (JCT-VC) of ITU-T SG16 WP3 and ISO/IEC JTC1/SC29/WG11, Jul. 14-22, 2011, JCTVC-F190.

Yue Yu et al., "On MPM determination and Planar mode signaling", Joint Collaborative Team on Video Coding (JCT-VC) of ITU-T SG16 WP3 and ISO/IEC JTC1/SC29/WG11, Feb. 1-10, 2012, JCTVC-H516.

Jie Yao, et al., "Non-CE3: Intra prediction information coding", Joint Video Experts Team (JVET) of ITU-T SC 16 WP 3 and ISO/IEC JTC 1/SC 29/WG 11, Jan. 9-18, 2019, JVET-M0210_v1.

* cited by examiner

FIG. 16A

Table 9

8.4.1 General decoding process for coding units coded in intra prediction mode

- If pcm_flag[ xCb ][ yCb ] is equal to 0, the following applies:
    1. If intra_planar_flag[ x0 ][ y0 ] equal to 1, IntraPredModeY[ xCb ][ yCb } is equal to INTRA_PLANAR.
    2. Overwise, the derivation process for the luma intra prediction mode as specified in clause 8.4.2 is invoked with the luma location ( xCb, yCb ), the width of the current coding block in luma samples cbWidth and the height of the current coding block in luma samples cbHeight as input. The output is IntraPredModeY[ xCb ][ yCb ] specifying the luma intra prediciton mode.

With the derivation of IntraPredModeY[ xCb ][ yCb ] in the previous steps, the general decoding process for intra blocks as specified in clause 8.4.4.1 is invoked with the luma location ( xCb, yCb ), the tree type treeType, the variable nTbW set equal to cbWidth, the variable nTbH set equal to cbHeight, the variable predModeIntra set equal to IntraPredModeY[ xCb ][ yCb ], and the variable cIdx set equal to 0 as inputs, and the output is a modified reconstructed picture before in-loop filtering.

<syntax elements and associated binarizations>

| Syntax structure | Syntax element | Binarization | |
|---|---|---|---|
| | | Process | Input parameters |
| coding_unit( ) | intra_planar_flag[ ][ ] | FL | cMax = 1 |

<Assignment of ctxInc to syntax elements with context coded bins>

Case I

| Syntax element | binIdx | | | | | |
|---|---|---|---|---|---|---|
| | 0 | 1 | 2 | 3 | 4 | >= 5 |
| intra_planar_flag[ ][ ] | 0 | na | na | na | na | na |

Case II

The assignment of ctxInc is specified as follows with condL and condA specified in for the syntax element intra_planar_flag[ x0 ][ y0 ]

FIG. 16B ctxInc = (condL && availableL ) || (conA && availableA) or ctxInc = (condL && availableL ) && (conA && availableA)

- condL == PLANAR ? 1 : 0
- condA == PLANAR ? 1 : 0
- availableL specifying the availability of the block located directly to the left of the current block.
- availableA specifying the availability of the block located directly to the left of the current block.
-

| Syntax element | binIdx | | | | | |
|---|---|---|---|---|---|---|
| | 0 | 1 | 2 | 3 | 4 | >= 5 |
| intra_planar_flag[ ][ ] | 0, 1 | na | na | na | na | na |

Case III

The assignment of ctxInc is specified as follows with condL and condA specified in for the syntax element intra_planar_flag[ x0 ][ y0 ]

ctxInc = (condL && availableL ) + (conA && availableA)

- condL == PLANAR ? 1 : 0
- condA == PLANAR ? 1 : 0
- availableL specifying the availability of the block located directly to the left of the current block.
- availableA specifying the availability of the block located directly to the left of the current block.

| Syntax element | binIdx | | | | | |
|---|---|---|---|---|---|---|
| | 0 | 1 | 2 | 3 | 4 | >= 5 |
| intra_planar_flag[ ][ ] | 0, 1, 2 | na | na | na | na | na |

The above embodiment (case I, case II, and case III) is just only one practical example, the number of context models may be arbitrarily determined.

FIG. 17A

Table 10

---

8.4.2  Derivation process for luma intra prediction mode

Derivation process for luma intra prediction mode

Input to this process are:

– a luma location ( xCb , yCb ) specifying the top-left sample of the current luma coding block relative to the top-left luma sample of the current picture, – a variable cbWidth specifying the width of the current coding block in luma samples, – a variable cbHeight specifying the height of the current coding block in luma samples.

In this process, the luma intra prediction mode IntraPredModeY[ xCb ][ yCb ] is derived.

Table 8-1 specifies the value for the intra prediction mode IntraPredModeY[ xCb ][ yCb ] and the associated names.

Table 8-1 – Specification of intra prediction mode and associated names

| Intra prediction mode | Associated name |
|---|---|
| 0 | INTRA_PLANAR |
| 1 | INTRA_DC |
| 2..66 | INTRA_ANGULAR2..INTRA_ANGULAR66 |
| 81..83 | INTRA_LT_CCLM, INTRA_L_CCLM, INTRA_T_CCLM |

NOTE – : The intra prediction modes INTRA_LT_CCLM, INTRA_L_CCLM and INTRA_T_CCLM are only applicable to chroma components.

IntraPredModeY[ xCb ][ yCb ] is derived by the following ordered steps:

1. The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.

2. For X being replaced by either A or B, the variables candIntraPredModeX are derived as follows:

– The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availablfor example, – The candidate intra prediction mode candIntraPredModeX is derived as follows:

–If one or more of the following conditions are true, candIntraPredModeX is set equal to INTRA_PLANAR.

FIG. 17B

- The variable availableX is equal to FALSE.
- CuPredMode[ xNbX ][ yNbX ] is not equal to MODE_INTRA
- pcm_flag[ xNbX ][ yNbX ] is equal to 1.
- X is equal to B and yCb − 1 is smaller than ( ( yCb >> CtbLog2SizeY ) << CtbLog2SizeY ).

–Otherwise, candIntraPredModeX is set equal to IntraPredModeY[ xNbX ][ yNbX ].

3. The candModeList[ x ] with x = 0..4 is derived as follows:

–If candIntraPredModeB is equal to candIntraPredModeA and candIntraPredModeA is greater than INTRA_DC, candModeList[ x ] with x = 0..4 is derived as follows:

$$\text{candModeList[ 0 ] = candIntraPredModeA} \quad (8\text{-}10)$$

$$\text{candModeList[ 1 ] = 2 + ( ( candIntraPredModeA + 61 ) \% 64 )} \quad (8\text{-}12)$$

$$\text{candModeList[ 2] = 2 + ( ( candIntraPredModeA − 1 ) \% 64 )} \quad (8\text{-}13)$$

$$\text{candModeList[ 3 ] = INTRA\_DC} \quad (8\text{-}11)$$

$$\text{candModeList[ 4 ] = 2 + ( ( candIntraPredModeA + 60 ) \% 64 )} \quad (8\text{-}14)$$

–Otherwise if candIntraPredModeB is not equal to candIntraPredModeA and candIntraPredModeA or candIntraPredModeB is greater than INTRA_DC, the following applies:

–The variables minAB and maxAB are derived as follows:

$$\text{minAB = Min( candIntraPredModeA, candIntraPredModeB )} \quad (8\text{-}24)$$

$$\text{maxAB = Max( candIntraPredModeA, candIntraPredModeB )} \quad (8\text{-}25)$$

–If candIntraPredModeA and candIntraPredModeB are both greater than INTRA_DC, candModeList[ x ] with x = 0..4 is derived as follows:

$$\text{candModeList[ 0 ] = candIntraPredModeA} \quad (8\text{-}27)$$

$$\text{candModeList[ 1 ] = candIntraPredModeB}$$

$$\text{candModeList[ 2 ] = INTRA\_DC} \quad (8\text{-}29)$$

- If maxAB − minAB is in the range of 2 to 62, inclusive, the following applies:

$$\text{candModeList[ 3 ] = 2 + ( ( maxAB + 61 ) \% 64 )} \quad (8\text{-}30)$$

$$\text{candModeList[ 4 ] = 2 + ( ( maxAB − 1 ) \% 64 )} \quad (8\text{-}31)$$

- Otherwise, the following applies:

$$\text{candModeList[ 3 ] = 2 + ( ( maxAB + 60 ) \% 64 )} \quad (8\text{-}32)$$

$$\text{candModeList[ 4 ] = 2 + ( ( maxAB ) \% 64 )} \quad (8\text{-}33)$$

FIG. 17C

-Otherwise (candIntraPredModeA or candIntraPredModeB is greater than INTRA_DC), candModeList[ x ] with x = 0..4 is derived as follows:

candModeList[ 0 ] = maxAB     (8-65)

candModeList[ 1 ] = INTRA_DC     (8-66)

candModeList[ 2 ] = 2 + ( ( maxAB + 61 ) % 64 )     (8-66)

candModeList[ 3 ] = 2 + ( ( maxAB − 1 ) % 64 )     (8-67)

candModeList[ 4 ] = 2 + ( ( maxAB + 60 ) % 64 )     (8-68)

-Otherwise, the following applies:

candModeList[ 0 ] = INTRA_DC     (8-71)

candModeList[ 1 ] = INTRA_ANGULAR50     (8-72)

candModeList[ 2 ] = INTRA_ANGULAR18     (8-73)

candModeList[ 3 ] = INTRA_ANGULAR46     (8-74)

candModeList[ 4 ] = INTRA_ANGULAR54     (8-75)

(8-81)

—

4. IntraPredModeY[ xCb ][ yCb ] is derived by applying the following procedure:

- If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].

- Otherwise, IntraPredModeY[ xCb ][ yCb ] is derived by applying the following ordered steps:

1. When candModeList[ i ] is greater than candModeList[ j ] for i = 0..4 and for each i, j = ( i + 1 )..5, both values are swapped as follows:

( candModeList[ i ], candModeList[ j ] ) = Swap( candModeList[ i ], candModeList[ j ] )     (8-94)

2. IntraPredModeY[ xCb ][ yCb ] is derived by the following ordered steps:

i. IntraPredModeY[ xCb ][ yCb ] is set equal to intra_luma_mpm_remainder[ xCb ][ yCb ].

ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

The variable IntraPredModeY[ x ][ y ] with x = xCb..xCb + cbWidth − 1 and y = yCb..yCb + cbHeight − 1 is set to be equal to IntraPredModeY[ xCb ][ yCb ].

FIG. 18A

Table 13

---

8.4.4.2.5 Specification of INTRA_PLANAR intra prediction mode

Specification of INTRA_PLANAR intra prediction mode

Inputs to this process are:

- a variable nTbW specifying the transform block width,
- a variable nTbH specifying the transform block height,
- a variable refIdx specifying the intra prediction reference line index,
- the neighbouring samples p[ x ][ y ], with x = −1−refIdx, y = −1−refIdx..nTbH and x = −refIdx..nTbW, y = −1−refIdx.

Outputs of this process are the predicted samples predSamples[ x ][ y ], with x = 0..nTbW − 1, y = 0..nTbH − 1.

The variables nW and nH are derived as follows:

nW = Max( nTbW, 2 )     (8-116)

nH = Max( nTbH, 2 )     (8-117)

The values of the prediction samples predSamples[ x ][ y ], with x = 0..nTbW − 1 and y = 0..nTbH − 1, are derived as follows:predV[ x ][ y ] = ( ( nH − 1 − y ) * p[ x ][ −1 −refIdx] + ( y + 1 ) * p[ −1− refIdx][ nTbH ] ) << Log2 ( nW )

(8-118)

predH[ x ][ y ] = ( ( nW − 1 − x ) * p[ −1−refIdx ][ y ] + ( x + 1 ) * p[ nTbW ][ −1− refIdx ] ) << Log2 ( nH )

(8-119)

predSamples[ x ][ y ] = ( predV[ x ][ y ] + predH[ x ][ y ] + nW * nH ) >> (Log2 ( nW ) + Log2 ( nH ) + 1 )

(8-120)

8.4.4.2.6 Specification of INTRA_DC intra prediction mode

Inputs to this process are:

- a variable nTbW specifying the transform block width,
- a variable nTbH specifying the transform block height,

FIG. 18B

- a variable refIdx specifying the intra prediction reference line index,
- the neighbouring samples p[ x ][ y ], with x = −1−refIdx, y = −1−refIdx..nTbH − 1 and x = −refIdx..nTbW − 1 , y = −1−refIdx.

Outputs of this process are the predicted samples predSamples[ x ][ y ], with x = 0..nTbW − 1, y = 0..nTbH − 1.

The values of the prediction samples predSamples[ x ][ y ], with x = 0..nTbW − 1, y = 0..nTbH − 1, are derived by the following ordered steps:

1. A variable dcVal is derived as follows:
   - When nTbW is equal to nTbH:

$$dcVal = \left(\sum_{x'=0}^{nTbW-1} p[x'][-1 - refIdx] + \sum_{y'=0}^{nTbH-1} p[-1 - refIdx][y'] + nTbW\right) \gg (Log2(nTbW) + 1)$$

(8-121)

- When nTbW is greater than nTbH:

$$dcVal = \left(\sum_{x'=0}^{nTbW-1} p[x'][-1 - refIdx] + (nTbW \gg 1)\right) \gg Log2(nTbW) \qquad (8\text{-}122)$$

- When nTbW is smaller than nTbH:

$$dcVal = \left(\sum_{y'=0}^{nTbH-1} p[-1 - refIdx][y'] + (nTbH \gg 1)\right) \gg Log2(nTbH) \qquad (8\text{-}123)$$

2. The prediction samples predSamples[x][y] are derived as follows:
predSamples[ x ][ y ] = dcVal, with x = 0.. nTbW − 1, y = 0.. nTbH − 1      (8-124)

FIG. 19A

Table 14

8.7.4.1 Transform process for scaled transform coefficients

Table 8-15 – Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_DC, INTRA_ANGULAR33, INTRA_ANGULAR35 | 0 | 0 |
| INTRA_ANGULAR2, INTRA_ANGULAR4,...,INTRA_ANGULAR28, INTRA_ANGULAR30, INTRA_ANGULAR39, INTRA_ANGULAR41,...,INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5,..., INTRA_ANGULAR27, INTRA_ANGULAR29, INTRA_ANGULAR38, INTRA_ANGULAR40,...,INTRA_ANGULAR64, INTRA_ANGULAR66 | 0 | ( nTbH >= 4 && nTbH <= 16 ) ? 1 : 0 |

Table 9-5 - Association of ctxIdxOffset and syntax elements for each initializationType in the initialization process

| Syntax structure | Syntax element | ctxTable | initType | | |
| --- | --- | --- | --- | --- | --- |
|  |  |  | 0 | 1 | 2 |
| coding_tree_unit( ) | alf_ctb_flag[ ][ ][ ] | Table 9-6 | 0 | 9 | 18 |

FIG. 19B

| | | | | 0 | 3 |
|---|---|---|---|---|---|
| coding_unit( ) | cu_skip_flag[ ][ ] | | | | |
| | pred_mode_ibc_flag | | | | |
| | pred_mode_flag | | | | |
| | intra_luma_ref_idx[ ][ ] | | | | |
| | intra_subpartitions_mode_flag | | | | |
| | intra_subpartition_split_flag | | | | |
| | intra_luma_mpm_flag[ ][ ] | | | | |
| | intra_planar_flag[ ][ ] | | | | |
| | intra_chroma_pred_mode[ ][ ] | | | | |
| | merge_flag[ ][ ] | | | | |
| | inter_pred_idc[ x0 ][ y0 ] | | | | |
| | inter_affine_flag[ ][ ] | | | | |
| | cu_affine_type_flag[ ][ ] | | | | |
| | ref_idx_l0[ ][ ] | | | | |
| | mvp_l0_flag[ ][ ] | | | | |
| | ref_idx_l1[ ][ ] | | | | |
| | mvp_l1_flag[ ][ ] | | | | |
| | avmr_flag[ ][ ] | | | | |
| | amvr_precision_flag[ ][ ] | | | | |
| | gbi_idx[ ][ ] | | | | |
| | cu_cbf | | | | |
| | cu_sbt_flag | | | | |
| | cu_sbt_quad_flag | | | | |
| | cu_sbt_horizontal_flag | | | | |
| | cu_sbt_pos_flag | | | | |

Table 9.9 - Syntax elements and associated binarizations

FIG. 19C

| Syntax structure | Syntax element | Binarization | |
|---|---|---|---|
| | | Process | Input parameters |
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_subpartitions_mode_flag | FL | cMax = 1 |
| | intra_subpartition_split_flag | FL | cMax = 1 |
| | intra_luma_mpm_flag[ ][ ] | FL | cMax = 1 |
| | intra_planar_flag[ ][ ] | FL | cMax=1 |
| | intra_luma_mpm_idx[ ][ ] | TR | cMax = 4, cRiceParam = 0 |
| | intra_luma_mpm_remainder[ ][ ] | TB | cMax = 60 |
| | intra_chroma_pred_mode[ ][ ] | 9.5.3.8 | - |
| | merge_flag[ ][ ] | FL | cMax = 1 |
| | inter_pred_idc[ x0 ][ y0 ] | 9.5.3.9 | cbWidth, cbHeight |
| | inter_affine_flag[ ][ ] | FL | cMax = 1 |
| | cu_affine_type_flag[ ][ ] | FL | cMax = 1 |
| | ref_idx_l0[ ][ ] | TR | cMax = NumRefIdxActive[ 0 ] − 1, cRiceParam = 0 |
| | mvp_l0_flag[ ][ ] | FL | cMax = 1 |
| | ref_idx_l1[ ][ ] | TR | cMax = NumRefIdxActive[ 1 ] − 1, cRiceParam = 0 |
| | mvp_l1_flag[ ][ ] | FL | cMax = 1 |
| | avmr_flag[ ][ ] | FL | cMax = 1 |
| | amvr_precision_flag[ ][ ] | FL | cMax = 1 |
| | gbi_idx[ ][ ] | TR | cMax = NoBackwardPredFlag ? 4: 2 |
| | cu_cbf | FL | cMax = 1 |
| | cu_sbt_flag | FL | cMax = 1 |
| | cu_sbt_quad_flag | FL | cMax = 1 |
| | cu_sbt_horizontal_flag | FL | cMax = 1 |
| | cu_sbt_pos_flag | FL | cMax = 1 |

FIG. 20A

Table 18

---

8.4.1 General decoding process for coding units coded in intra prediction mode

- If pcm_flag[ xCb ][ yCb ] is equal to 0, the following applies:
    1. If intra_planar_flag[ x0 ][ y0 ] equal to 1, IntraPredModeY[ xCb ][ yCb ] is equal to INTRA_PLANAR.
    2. Overwise, the derivation process for the luma intra prediction mode as specified in clause 8.4.2 is invoked with the luma location ( xCb, yCb ), the width of the current coding block in luma samples cbWidth and the height of the current coding block in luma samples cbHeight as input. The output is IntraPredModeY[ xCb ][ yCb ] specifying the luma intra prediciton mode.

With the derivation of IntraPredModeY[ xCb ][ yCb ] in the previous steps, the general decoding process for intra blocks as specified in clause 8.4.4.1 is invoked with the luma location ( xCb, yCb ), the tree type treeType, the variable nTbW set equal to cbWidth, the variable nTbH set equal to cbHeight, the variable predModeIntra set equal to IntraPredModeY[ xCb ][ yCb ], and the variable cIdx set equal to 0 as inputs, and the output is a modified reconstructed picture before in-loop filtering.

<syntax elements and associated binarizations>

| Syntax structure | Syntax element | Binarization | |
|---|---|---|---|
| | | Process | Input parameters |
| coding_unit( ) | intra_planar_flag[ ][ ] | FL | cMax = 1 |

<Assignment of ctxInc to syntax elements with context coded bins>

Case I

| Syntax element | binIdx | | | | | |
|---|---|---|---|---|---|---|
| | 0 | 1 | 2 | 3 | 4 | >= 5 |
| intra_planar_flag[ ][ ] | 0 | na | na | na | na | na |

Case II

The assignment of ctxInc is specified as follows with condL and condA specified in for the syntax element intra_planar_flag[ x0 ][ y0 ]

FIG. 20B ctxInc = (condL && availableL ) || (conA && availableA) or ctxInc = (condL && availableL ) && (conA && availableA)

- condL == PLANAR ? 1 : 0
- condA == PLANAR ? 1 : 0
- availableL specifying the availability of the block located directly to the left of the current block.
- availableA specifying the availability of the block located directly to the left of the current block.
-

| Syntax element | binIdx | | | | | |
|---|---|---|---|---|---|---|
| | 0 | 1 | 2 | 3 | 4 | >= 5 |
| intra_planar_flag[ ][ ] | 0, 1 | na | na | na | na | na |

Case III

The assignment of ctxInc is specified as follows with condL and condA specified in for the syntax element intra_planar_flag[ x0 ][ y0 ]

ctxInc = (condL && availableL ) + (conA && availableA)

- condL == PLANAR ? 1 : 0
- condA == PLANAR ? 1 : 0
- availableL specifying the availability of the block located directly to the left of the current block.
- availableA specifying the availability of the block located directly to the left of the current block.

| Syntax element | binIdx | | | | | |
|---|---|---|---|---|---|---|
| | 0 | 1 | 2 | 3 | 4 | >= 5 |
| intra_planar_flag[ ][ ] | 0, 1, 2 | na | na | na | na | na |

The above embodiment (case I, case II, and case III) is just only one practical example, the number of context models may be arbitrarily determined.

FIG. 21A

Table 19

---

8.4.2 Derivation process for luma intra prediction mode

Derivation process for luma intra prediction mode

Input to this process are:

- a luma location ( xCb , yCb ) specifying the top-left sample of the current luma coding block relative to the top-left luma sample of the current picture,
- a variable cbWidth specifying the width of the current coding block in luma samples,
- a variable cbHeight specifying the height of the current coding block in luma samples.

In this process, the luma intra prediction mode IntraPredModeY[ xCb ][ yCb ] is derived.

Table 8-1 specifies the value for the intra prediction mode IntraPredModeY[ xCb ][ yCb ] and the associated names.

Table 8-1 – Specification of intra prediction mode and associated names

| Intra prediction mode | Associated name |
|---|---|
| 0 | INTRA_PLANAR |
| 1 | INTRA_DC |
| 2..66 | INTRA_ANGULAR2..INTRA_ANGULAR66 |
| 81..83 | INTRA_LT_CCLM, INTRA_L_CCLM, INTRA_T_CCLM |

NOTE – : The intra prediction modes INTRA_LT_CCLM, INTRA_L_CCLM and INTRA_T_CCLM are only applicable to chroma components.

IntraPredModeY[ xCb ][ yCb ] is derived by the following ordered steps:

1. The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.

2. For X being replaced by either A or B, the variables candIntraPredModeX are derived as follows:
   - The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availablXfor example,
   - The candidate intra prediction mode candIntraPredModeX is derived as follows:
     - If one or more of the following conditions are true, candIntraPredModeX is set equal to INTRA_PLANAR.
       - The variable availableX is equal to FALSE.

FIG. 21B

- CuPredMode[ xNbX ][ yNbX ] is not equal to MODE_INTRA
- pcm_flag[ xNbX ][ yNbX ] is equal to 1.
- X is equal to B and yCb − 1 is smaller than ( ( yCb >> CtbLog2SizeY ) << CtbLog2SizeY ).

–Otherwise, candIntraPredModeX is set equal to IntraPredModeY[ xNbX ][ yNbX ].

3. The candModeList[ x ] with x = 0..4 is derived as follows:

–If candIntraPredModeB is equal to candIntraPredModeA and candIntraPredModeA is greater than INTRA_DC, candModeList[ x ] with x = 0..4 is derived as follows:

$$candModeList[ 0 ] = candIntraPredModeA \qquad (8\text{-}10)$$

$$candModeList[ 1 ] = 2 + ( ( candIntraPredModeA + 61 ) \% 64 ) \qquad (8\text{-}12)$$

$$candModeList[ 2] = 2 + ( ( candIntraPredModeA - 1 ) \% 64 ) \qquad (8\text{-}13)$$

$$candModeList[ 3 ] = INTRA\_DC \qquad (8\text{-}11)$$

$$candModeList[ 4 ] = 2 + ( ( candIntraPredModeA + 60 ) \% 64 ) \qquad (8\text{-}14)$$

–Otherwise if candIntraPredModeB is not equal to candIntraPredModeA and candIntraPredModeA or candIntraPredModeB is greater than INTRA_DC, the following applies:

–The variables minAB and maxAB are derived as follows:

$$minAB = Min( candIntraPredModeA, candIntraPredModeB ) \qquad (8\text{-}24)$$

$$maxAB = Max( candIntraPredModeA, candIntraPredModeB ) \qquad (8\text{-}25)$$

–If candIntraPredModeA and candIntraPredModeB are both greater than INTRA_DC, candModeList[ x ] with x = 0..4 is derived as follows:

$$candModeList[ 0 ] = candIntraPredModeA \qquad (8\text{-}27)$$

$$candModeList[ 1 ] = candIntraPredModeB$$

$$candModeList[ 2 ] = INTRA\_DC \qquad (8\text{-}29)$$

- If maxAB − minAB is in the range of 2 to 62, inclusive, the following applies:

$$candModeList[ 3 ] = 2 + ( ( maxAB + 61 ) \% 64 ) \qquad (8\text{-}30)$$

$$candModeList[ 4 ] = 2 + ( ( maxAB - 1 ) \% 64 ) \qquad (8\text{-}31)$$

- Otherwise, the following applies:

$$candModeList[ 3 ] = 2 + ( ( maxAB + 60 ) \% 64 ) \qquad (8\text{-}32)$$

$$candModeList[ 4 ] = 2 + ( ( maxAB ) \% 64 ) \qquad (8\text{-}33)$$

FIG. 21C

– Otherwise (candIntraPredModeA or candIntraPredModeB is greater than INTRA_DC), candModeList[ x ] with x = 0..4 is derived as follows:

$$\text{candModeList}[\,0\,] = \text{maxAB} \tag{8-65}$$

$$\text{candModeList}[\,1\,] = \text{INTRA\_DC} \tag{8-66}$$

$$\text{candModeList}[\,2\,] = 2 + (\,(\,\text{maxAB} + 61\,)\,\%\,64\,) \tag{8-66}$$

$$\text{candModeList}[\,3\,] = 2 + (\,(\,\text{maxAB} - 1\,)\,\%\,64\,) \tag{8-67}$$

$$\text{candModeList}[\,4\,] = 2 + (\,(\,\text{maxAB} + 60\,)\,\%\,64\,) \tag{8-68}$$

– Otherwise, the following applies:

$$\text{candModeList}[\,0\,] = \text{INTRA\_DC} \tag{8-71}$$

$$\text{candModeList}[\,1\,] = \text{INTRA\_ANGULAR50} \tag{8-72}$$

$$\text{candModeList}[\,2\,] = \text{INTRA\_ANGULAR18} \tag{8-73}$$

$$\text{candModeList}[\,3\,] = \text{INTRA\_ANGULAR46} \tag{8-74}$$

$$\text{candModeList}[\,4\,] = \text{INTRA\_ANGULAR54} \tag{8-75}$$

$$(8\text{-}81)$$

—

4. IntraPredModeY[ xCb ][ yCb ] is derived by applying the following procedure:

– If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].

– Otherwise, IntraPredModeY[ xCb ][ yCb ] is derived by applying the following ordered steps:

1. When candModeList[ i ] is greater than candModeList[ j ] for i = 0..4 and for each i, j = ( i + 1 )..5, both values are swapped as follows:

( candModeList[ i ], candModeList[ j ] ) = Swap( candModeList[ i ], candModeList[ j ] )　　　(8-94)

2. IntraPredModeY[ xCb ][ yCb ] is derived by the following ordered steps:

i. IntraPredModeY[ xCb ][ yCb ] is set equal to intra_luma_mpm_remainder[ xCb ][ yCb ].

ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

The variable IntraPredModeY[ x ][ y ] with x = xCb..xCb + cbWidth − 1 and y = yCb..yCb + cbHeight − 1 is set to be equal to IntraPredModeY[ xCb ][ yCb ].

FIG. 22A

Table 22

---

8.4.4.2.5 Specification of INTRA_PLANAR intra prediction mode

Specification of INTRA_PLANAR intra prediction mode

Inputs to this process are:

- a variable nTbW specifying the transform block width,
- a variable nTbH specifying the transform block height,
- a variable refIdx specifying the intra prediction reference line index,
- the neighbouring samples p[ x ][ y ], with x = −1−refIdx, y = −1−refIdx..nTbH and x = −refIdx..nTbW, y = −1−refIdx.

Outputs of this process are the predicted samples predSamples[ x ][ y ], with x = 0..nTbW − 1, y = 0..nTbH − 1.

The variables nW and nH are derived as follows:

nW = Max( nTbW, 2 )

(8-116)

nH = Max( nTbH, 2 )  (8-117)

The values of the prediction samples predSamples[ x ][ y ], with x = 0..nTbW − 1 and y = 0..nTbH − 1, are derived as follows:predV[ x ][ y ] = ( ( nH − 1 − y ) * p[ x ][ −1 −refIdx] + ( y + 1 ) * p[ −1− refIdx][ nTbH ] ) << Log2 ( nW )

(8-118)

predH[ x ][ y ] = ( ( nW − 1 − x ) * p[ −1− refIdx ][ y ] + ( x + 1 ) * p[ nTbW ][ −1− refIdx ] ) << Log2 ( nH )

(8-119)

predSamples[ x ][ y ] = ( predV[ x ][ y ] + predH[ x ][ y ] + nW * nH ) >> (Log2 ( nW ) + Log2 ( nH ) + 1 )

8.4.4.2.6 Specification of INTRA_DC intra prediction mode

Inputs to this process are:

- a variable nTbW specifying the transform block width,
- a variable nTbH specifying the transform block height,
- a variable refIdx specifying the intra prediction reference line index,
- the neighbouring samples p[ x ][ y ], with x = −1−refIdx, y = −1−refIdx..nTbH − 1 and x = −refIdx..nTbW − 1 , y = −1−refIdx.

Outputs of this process are the predicted samples predSamples[ x ][ y ], with x = 0..nTbW − 1, y = 0..nTbH − 1.

The values of the prediction samples predSamples[ x ][ y ], with x = 0..nTbW − 1, y = 0..nTbH − 1, are derived by the following ordered steps:

1. A variable dcVal is derived as follows:

- When nTbW is equal to nTbH:

$$dcVal = \left(\sum_{x'=0}^{nTbW-1} p[x'][-1-refIdx] + \sum_{y'=0}^{nTbH-1} p[-1-refIdx][y'] + nTbW\right) \gg (Log2(nTbW) + 1)$$

(8-121)

- When nTbW is greater than nTbH:

$$dcVal = \left(\sum_{x'=0}^{nTbW-1} p[x'][-1-refIdx] + (nTbW \gg 1)\right) \gg Log2(nTbW) \quad (8\text{-}122)$$

- When nTbW is smaller than nTbH:

$$dcVal = \left(\sum_{y'=0}^{nTbH-1} p[-1-refIdx][y'] + (nTbH \gg 1)\right) \gg Log2(nTbH) \quad (8\text{-}123)$$

2. The prediction samples predSamples[x][y] are derived as follows:
predSamples[ x ][ y ] = dcVal, with x = 0.. nTbW − 1, y = 0.. nTbH − 1    (8-124)

FIG. 23A

Table 23

---

8.7.4.1 Transform process for scaled transform coefficients

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

The variable implicitMtsEnabled is derived as follows:

- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is smaller than or equal to 32
  - sps_explicit_mts_intra_enabled_flag and sps_explicit_mts_inter_enabled_flag are both equal to 0 and CuPredMode[ xTbY ][ yTbY ] is equal to MODE_INTRA
- Otherwise, implicitMtsEnabled is set equal to 0.

The variable trTypeHor specifying the horizontal transform kernel and the variable trTypeVer specifying the vertical transform kernel are derived as follows:

- If cIdx is greater than 0, trTypeHor and trTypeVer are set equal to 0.
- Otherwise, if implicitMtsEnabled is equal to 1, the following applies:
  - If IntraSubPartitionsSplitType is not equal to ISP_NO_SPLIT or (sps_explicit_mts_intra_enabled_flag and sps_explicit_mts_inter_enabled_flag are equal to 0), trTypeHor and trTypeVer are derived as follows

- trTypeHor = ( nTbW >= 4 && nTbW <= 16 ) ? 1 : 0     (8-1028)

- trTypeVer = ( nTbH >= 4 && nTbH <= 16 ) ? 1 : 0     (8-1029)

Otherwise, if cu_sbt_flag is equal to 1, trTypeHor and trTypeVer are specified in Table 8-14 depending on cu_sbt_horizontal_flag and cu_sbt_pos_flag.

FIG. 23B

Table 9-5 - Association of ctxIdxOffset and syntax elements for each initializationType in the initialization process

| Syntax structure | Syntax element | ctxTable | initType | | |
|---|---|---|---|---|---|
| | | | 0 | 1 | 2 |
| coding_tree_unit( ) | alf_ctb_flag[ ][ ][ ] | Table 9-6 | 0 | 9 | 18 |

...

| | | | | | |
|---|---|---|---|---|---|
| coding_unit( ) | cu_skip_flag[ ][ ] | | | 0 | 3 |
| | pred_mode_ibc_flag | | | | |
| | pred_mode_flag | | | | |
| | intra_luma_ref_idx[ ][ ] | | | | |
| | intra_subpartitions_mode_flag | | | | |
| | intra_subpartition_split_flag | | | | |
| | intra_luma_mpm_flag[ ][ ] | | | | |
| | intra_planar_flag[ ][ ] | | | | |
| | intra_chroma_pred_mode[ ][ ] | | | | |
| | merge_flag[ ][ ] | | | | |
| | inter_pred_idc[ x0 ][ y0 ] | | | | |
| | inter_affine_flag[ ][ ] | | | | |
| | cu_affine_type_flag[ ][ ] | | | | |
| | ref_idx_l0[ ][ ] | | | | |
| | mvp_l0_flag[ ][ ] | | | | |
| | ref_idx_l1[ ][ ] | | | | |
| | mvp_l1_flag[ ][ ] | | | | |
| | avmr_flag[ ][ ] | | | | |
| | amvr_precision_flag[ ][ ] | | | | |
| | gbi_idx[ ][ ] | | | | |
| | cu_cbf | | | | |
| | cu_sbt_flag | | | | |
| | cu_sbt_quad_flag | | | | |
| | cu_sbt_horizontal_flag | | | | |

FIG. 23C

|  | cu_sbt_pos_flag |  |  |  |  |

Table 9.9 - Syntax elements and associated binarizations

| Syntax structure | Syntax element | Binarization | |
| --- | --- | --- | --- |
|  |  | Process | Input parameters |
| coding_unit( ) | cu_skip_flag[ ][ ] | FL | cMax = 1 |
|  | pred_mode_ibc_flag | FL | cMax = 1 |
|  | pred_mode_flag | FL | cMax = 1 |
|  | pcm_flag[ ][ ] | FL | cMax = 1 |
|  | intra_luma_ref_idx[ ][ ] | TR | cMax = 2, cRiceParam = 0 |
|  | intra_subpartitions_mode_flag | FL | cMax = 1 |
|  | intra_subpartition_split_flag | FL | cMax = 1 |
|  | intra_luma_mpm_flag[ ][ ] | FL | cMax = 1 |
|  | intra_planar_flag[ ][ ] | FL | cMax=1 |
|  | intra_luma_mpm_idx[ ][ ] | TR | cMax = 4, cRiceParam = 0 |
|  | intra_luma_mpm_remainder[ ][ ] | TB | cMax = 60 |
|  | intra_chroma_pred_mode[ ][ ] | 9.5.3.8 | - |
|  | merge_flag[ ][ ] | FL | cMax = 1 |
|  | inter_pred_idc[ x0 ][ y0 ] | 9.5.3.9 | cbWidth, cbHeight |
|  | inter_affine_flag[ ][ ] | FL | cMax = 1 |
|  | cu_affine_type_flag[ ][ ] | FL | cMax = 1 |
|  | ref_idx_l0[ ][ ] | TR | cMax = NumRefIdxActive[ 0 ] – 1, cRiceParam = 0 |
|  | mvp_l0_flag[ ][ ] | FL | cMax = 1 |
|  | ref_idx_l1[ ][ ] | TR | cMax = NumRefIdxActive[ 1 ] – 1, cRiceParam = 0 |
|  | mvp_l1_flag[ ][ ] | FL | cMax = 1 |
|  | avmr_flag[ ][ ] | FL | cMax = 1 |
|  | amvr_precision_flag[ ][ ] | FL | cMax = 1 |
|  | gbi_idx[ ][ ] | TR | cMax = NoBackwardPredFlag ? 4: 2 |
|  | cu_cbf | FL | cMax = 1 |

FIG. 23D

|  | cu_sbt_flag | FL | cMax = 1 |
|--|--|--|--|
|  | cu_sbt_quad_flag | FL | cMax = 1 |
|  | cu_sbt_horizontal_flag | FL | cMax = 1 |
|  | cu_sbt_pos_flag | FL | cMax = 1 |

FIG. 24A

Table 27

| 8.4.1 General decoding process for coding units coded in intra prediction mode |
|---|
| – If pcm_flag[ xCb ][ yCb ] is equal to 0, the following applies: |
|     1. If intra_planar_flag[ x0 ][ y0 ] equal to 1, IntraPredModeY[ xCb ][ yCb ] is equal to INTRA_PLANAR. |
|     2. Overwise, the derivation process for the luma intra prediction mode as specified in clause 8.4.2 is invoked with the luma location ( xCb, yCb ), the width of the current coding block in luma samples cbWidth and the height of the current coding block in luma samples cbHeight as input. The output is IntraPredModeY[ xCb ][ yCb ] specifying the luma intra prediciton mode. |
| With the derivation of IntraPredModeY[ xCb ][ yCb ] in the previous steps, the general decoding process for intra blocks as specified in clause 8.4.4.1 is invoked with the luma location ( xCb, yCb ), the tree type treeType, the variable nTbW set equal to cbWidth, the variable nTbH set equal to cbHeight, the variable predModeIntra set equal to IntraPredModeY[ xCb ][ yCb ], and the variable cIdx set equal to 0 as inputs, and the output is a modified reconstructed picture before in-loop filtering. |
| <syntax elements and associated binarizations> |

| Syntax structure | Syntax element | Binarization | |
|---|---|---|---|
| | | Process | Input parameters |
| coding_unit( ) | intra_planar_flag[ ][ ] | FL | cMax = 1 |

<Assignment of ctxInc to syntax elements with context coded bins>
Case I

| Syntax element | binIdx | | | | | |
|---|---|---|---|---|---|---|
| | 0 | 1 | 2 | 3 | 4 | >= 5 |
| intra_planar_flag[ ][ ] | 0 | na | na | na | na | na |

Case II
The assignment of ctxInc is specified as follows with condL and condA specified in for the syntax element intra_planar_flag[ x0 ][ y0 ]

ctxInc = (condL && availableL ) || (conA && availableA) or ctxInc = (condL && availableL ) && (conA && availableA)

- condL == PLANAR ? 1 : 0
- condA == PLANAR ? 1 : 0
- availableL specifying the availability of the block located directly to the left of the current block.
- availableA specifying the availability of the block located directly to the left of the current block.
-

| Syntax element | binIdx | | | | | |
|---|---|---|---|---|---|---|
| | 0 | 1 | 2 | 3 | 4 | >= 5 |
| intra_planar_flag[ ][ ] | 0, 1 | na | na | na | na | na |

Case III
The assignment of ctxInc is specified as follows with condL and condA specified in for the syntax element intra_planar_flag[ x0 ][ y0 ]

ctxInc = (condL && availableL ) + (conA && availableA)

FIG. 24B

- condL == PLANAR ? 1 : 0
- condA == PLANAR ? 1 : 0
- availableL specifying the availability of the block located directly to the left of the current block.
- availableA specifying the availability of the block located directly to the left of the current block.

| Syntax element | binIdx | | | | | |
|---|---|---|---|---|---|---|
| | 0 | 1 | 2 | 3 | 4 | >= 5 |
| intra_planar_flag[ ][ ] | 0, 1, 2 | na | na | na | na | na |

The above embodiment (case I, case II, and case III) is just only one practical example, the number of context models may be arbitrarily determined.

FIG. 25A

Table 28

> 8.4.2 Derivation process for luma intra prediction mode
>
> Derivation process for luma intra prediction mode
>
> Input to this process are:
>
> – a luma location ( xCb , yCb ) specifying the top-left sample of the current luma coding block relative to the top-left luma sample of the current picture,
>
> – a variable cbWidth specifying the width of the current coding block in luma samples,
>
> – a variable cbHeight specifying the height of the current coding block in luma samples.
>
> In this process, the luma intra prediction mode IntraPredModeY[ xCb ][ yCb ] is derived.
>
> Table 8-1 specifies the value for the intra prediction mode IntraPredModeY[ xCb ][ yCb ] and the associated names.
>
> Table 8-1 – Specification of intra prediction mode and associated names
>
> | Intra prediction mode | Associated name |
> |---|---|
> | 0 | INTRA_PLANAR |
> | 1 | INTRA_DC |
> | 2..66 | INTRA_ANGULAR2..INTRA_ANGULAR66 |
> | 81..83 | INTRA_LT_CCLM, INTRA_L_CCLM, INTRA_T_CCLM |
>
> NOTE – : The intra prediction modes INTRA_LT_CCLM, INTRA_L_CCLM and INTRA_T_CCLM are only applicable to chroma components.
>
> IntraPredModeY[ xCb ][ yCb ] is derived by the following ordered steps:
>
> 1. The neighbouring locations ( xNbA, yNbA ) and ( xNbB, yNbB ) are set equal to ( xCb – 1, yCb + cbHeight – 1 ) and ( xCb + cbWidth – 1, yCb – 1 ), respectively.
>
> 2. For X being replaced by either A or B, the variables candIntraPredModeX are derived as follows:
>
>    – The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availablfor example,
>
>    – The candidate intra prediction mode candIntraPredModeX is derived as follows:
>
>       – If one or more of the following conditions are true, candIntraPredModeX is set equal to INTRA_PLANAR.
>
>          – The variable availableX is equal to FALSE.

FIG. 25B

- CuPredMode[ xNbX ][ yNbX ] is not equal to MODE_INTRA
- pcm_flag[ xNbX ][ yNbX ] is equal to 1.
- X is equal to B and yCb − 1 is smaller than ( ( yCb >> CtbLog2SizeY ) << CtbLog2SizeY ).

−Otherwise, candIntraPredModeX is set equal to IntraPredModeY[ xNbX ][ yNbX ].

3. The candModeList[ x ] with x = 0..4 is derived as follows:

−If candIntraPredModeB is equal to candIntraPredModeA and candIntraPredModeA is greater than INTRA_DC, candModeList[ x ] with x = 0..4 is derived as follows:

$$\text{candModeList[ 0 ]} = \text{candIntraPredModeA} \quad (8\text{-}10)$$

$$\text{candModeList[ 1 ]} = 2 + ( ( \text{candIntraPredModeA} + 61 ) \% 64 ) \quad (8\text{-}12)$$

$$\text{candModeList[ 2]} = 2 + ( ( \text{candIntraPredModeA} - 1 ) \% 64 ) \quad (8\text{-}13)$$

$$\text{candModeList[ 3 ]} = \text{INTRA\_DC} \quad (8\text{-}11)$$

$$\text{candModeList[ 4 ]} = 2 + ( ( \text{candIntraPredModeA} + 60 ) \% 64 ) \quad (8\text{-}14)$$

−Otherwise if candIntraPredModeB is not equal to candIntraPredModeA and candIntraPredModeA or candIntraPredModeB is greater than INTRA_DC, the following applies:

−The variables minAB and maxAB are derived as follows:

$$\text{minAB} = \text{Min}( \text{candIntraPredModeA}, \text{candIntraPredModeB} ) \quad (8\text{-}24)$$

$$\text{maxAB} = \text{Max}( \text{candIntraPredModeA}, \text{candIntraPredModeB} ) \quad (8\text{-}25)$$

−If candIntraPredModeA and candIntraPredModeB are both greater than INTRA_DC, candModeList[ x ] with x = 0..4 is derived as follows:

$$\text{candModeList[ 0 ]} = \text{candIntraPredModeA} \quad (8\text{-}27)$$

$$\text{candModeList[ 1 ]} = \text{candIntraPredModeB}$$

$$\text{candModeList[ 2 ]} = \text{INTRA\_DC} \quad (8\text{-}29)$$

- If maxAB − minAB is in the range of 2 to 62, inclusive, the following applies:

$$\text{candModeList[ 3 ]} = 2 + ( ( \text{maxAB} + 61 ) \% 64 ) \quad (8\text{-}30)$$

$$\text{candModeList[ 4 ]} = 2 + ( ( \text{maxAB} - 1 ) \% 64 ) \quad (8\text{-}31)$$

- Otherwise, the following applies:

$$\text{candModeList[ 3 ]} = 2 + ( ( \text{maxAB} + 60 ) \% 64 ) \quad (8\text{-}32)$$

FIG. 25C $$\text{candModeList}[\ 4\ ] = 2 + (\ (\ \text{maxAB}\ )\ \%\ 64\ ) \quad (8\text{-}33)$$

– Otherwise (candIntraPredModeA or candIntraPredModeB is greater than INTRA_DC), candModeList[ x ] with x = 0..4 is derived as follows:

$$\text{candModeList}[\ 0\ ] = \text{maxAB} \quad (8\text{-}65)$$

$$\text{candModeList}[\ 1\ ] = \text{INTRA\_DC} \quad (8\text{-}66)$$

$$\text{candModeList}[\ 2\ ] = 2 + (\ (\ \text{maxAB} + 61\ )\ \%\ 64\ ) \quad (8\text{-}66)$$

$$\text{candModeList}[\ 3\ ] = 2 + (\ (\ \text{maxAB} - 1\ )\ \%\ 64\ ) \quad (8\text{-}67)$$

$$\text{candModeList}[\ 4\ ] = 2 + (\ (\ \text{maxAB} + 60\ )\ \%\ 64\ ) \quad (8\text{-}68)$$

– Otherwise, the following applies:

$$\text{candModeList}[\ 0\ ] = \text{INTRA\_DC} \quad (8\text{-}71)$$

$$\text{candModeList}[\ 1\ ] = \text{INTRA\_ANGULAR50} \quad (8\text{-}72)$$

$$\text{candModeList}[\ 2\ ] = \text{INTRA\_ANGULAR18} \quad (8\text{-}73)$$

$$\text{candModeList}[\ 3\ ] = \text{INTRA\_ANGULAR46} \quad (8\text{-}74)$$

$$\text{candModeList}[\ 4\ ] = \text{INTRA\_ANGULAR54} \quad (8\text{-}75)$$

$$(8\text{-}81)$$

—

4. IntraPredModeY[ xCb ][ yCb ] is derived by applying the following procedure:
   - If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
   - Otherwise, IntraPredModeY[ xCb ][ yCb ] is derived by applying the following ordered steps:

1. When candModeList[ i ] is greater than candModeList[ j ] for i = 0..4 and for each i, j = ( i + 1 )..5, both values are swapped as follows:

( candModeList[ i ], candModeList[ j ] ) = Swap( candModeList[ i ], candModeList[ j ] )     (8-94)

2. IntraPredModeY[ xCb ][ yCb ] is derived by the following ordered steps:
      i. IntraPredModeY[ xCb ][ yCb ] is set equal to intra_luma_mpm_remainder[ xCb ][ yCb ].

FIG. 25D

> ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.
>
> The variable IntraPredModeY[ x ][ y ] with x = xCb..xCb + cbWidth − 1 and y = yCb..yCb + cbHeight − 1 is set to be equal to IntraPredModeY[ xCb ][ yCb ].

FIG. 26A

Table 31

8.4.4.2.5 Specification of INTRA_PLANAR intra prediction mode

Specification of INTRA_PLANAR intra prediction mode

Inputs to this process are:

- a variable nTbW specifying the transform block width,
- a variable nTbH specifying the transform block height,
- a variable refIdx specifying the intra prediction reference line index,
- the neighbouring samples p[ x ][ y ], with x = −1−refIdx, y = −1−refIdx..nTbH and x = −refIdx..nTbW, y = −1−refIdx.

Outputs of this process are the predicted samples predSamples[ x ][ y ], with x = 0..nTbW − 1, y = 0..nTbH − 1.

The variables nW and nH are derived as follows:

nW = Max( nTbW, 2 )

(8-116)

nH = Max( nTbH, 2 )                     (8-117)

The values of the prediction samples predSamples[ x ][ y ], with x = 0..nTbW − 1 and y = 0..nTbH − 1, are derived as follows:predV[ x ][ y ] = ( ( nH − 1 − y ) * p[ x ][ −1 −refIdx] + ( y + 1 ) * p[ −1− refIdx][ nTbH ] ) << Log2 ( nW )
(8-118)

predH[ x ][ y ] = ( ( nW − 1 − x ) * p[ −1− refIdx ][ y ] + ( x + 1 ) * p[ nTbW ][ −1− refIdx ] ) << Log2 ( nH )

(8-119)

predSamples[ x ][ y ] = ( predV[ x ][ y ] + predH[ x ][ y ] + nW * nH ) >> (Log2 ( nW ) + Log2 ( nH ) + 1 )
(8-120)

8.4.4.2.6 Specification of INTRA_DC intra prediction mode

Inputs to this process are:

- a variable nTbW specifying the transform block width,
- a variable nTbH specifying the transform block height,

FIG. 26B

- a variable refIdx specifying the intra prediction reference line index,
- the neighbouring samples p[ x ][ y ], with x = −1−refIdx, y = −1−refIdx..nTbH − 1 and x = −refIdx..nTbW − 1 , y = −1−refIdx.

Outputs of this process are the predicted samples predSamples[ x ][ y ], with x = 0..nTbW − 1, y = 0..nTbH − 1.

The values of the prediction samples predSamples[ x ][ y ], with x = 0..nTbW − 1, y = 0..nTbH − 1, are derived by the following ordered steps:

1. A variable dcVal is derived as follows:
    - When nTbW is equal to nTbH:

$$\text{dcVal} = \left(\sum_{x'=0}^{nTbW-1} p[x'][-1 - \text{refIdx}] + \sum_{y'=0}^{nTbH-1} p[-1 - \text{refIdx}][y'] + nTbW\right) \gg (\text{Log2}(nTbW) + 1)$$
    (8-121)

- When nTbW is greater than nTbH:

$$\text{dcVal} = \left(\sum_{x'=0}^{nTbW-1} p[x'][-1 - \text{refIdx}] + (nTbW \gg 1)\right) \gg \text{Log2}(nTbW) \qquad (8\text{-}122)$$

- When nTbW is smaller than nTbH:

$$\text{dcVal} = \left(\sum_{y'=0}^{nTbH-1} p[-1 - \text{refIdx}][y'] + (nTbH \gg 1)\right) \gg \text{Log2}(nTbH) \qquad (8\text{-}123)$$

2. The prediction samples predSamples[x][y] are derived as follows:
predSamples[ x ][ y ] = dcVal, with x = 0.. nTbW − 1, y = 0.. nTbH − 1    (8-124)

FIG. 27A

Table 32

---

8.7.4.1 Transform process for scaled transform coefficients

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

The variable implicitMtsEnabled is derived as follows:

- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is smaller than or equal to 32
  - sps_explicit_mts_intra_enabled_flag and sps_explicit_mts_inter_enabled_flag are both equal to 0 and CuPredMode[ xTbY ][ yTbY ] is equal to MODE_INTRA
- Otherwise, implicitMtsEnabled is set equal to 0.

The variable trTypeHor specifying the horizontal transform kernel and the variable trTypeVer specifying the vertical transform kernel are derived as follows:

- If cIdx is greater than 0, trTypeHor and trTypeVer are set equal to 0.
- Otherwise, if implicitMtsEnabled is equal to 1, the following applies:
  - If IntraSubPartitionsSplitType is not equal to ISP_NO_SPLIT or (sps_explicit_mts_intra_enabled_flag and sps_explicit_mts_inter_enabled_flag are equal to 0), trTypeHor and trTypeVer are derived as follows
    - trTypeHor = ( nTbW >= 4 && nTbW <= 16 ) ? 1 : 0      (8-1028)
    - trTypeVer = ( nTbH >= 4 && nTbH <= 16 ) ? 1 : 0      (8-1029)

Otherwise, if cu_sbt_flag is equal to 1, trTypeHor and trTypeVer are specified in Table 8-14 depending on cu_sbt_horizontal_flag and cu_sbt_pos_flag.

FIG. 27B

Table 9-5 - Association of ctxIdxOffset and syntax elements for each initializationType in the initialization process

| Syntax structure | Syntax element | ctxTable | initType | | |
|---|---|---|---|---|---|
| | | | 0 | 1 | 2 |
| coding_tree_unit( ) | alf_ctb_flag[ ][ ][ ] | Table 9-6 | 0 | 9 | 18 |
| ... | | | | | |
| coding_unit( ) | cu_skip_flag[ ][ ] | | | 0 | 3 |
| | pred_mode_ibc_flag | | | | |
| | pred_mode_flag | | | | |
| | intra_luma_ref_idx[ ][ ] | | | | |
| | intra_subpartitions_mode_flag | | | | |
| | intra_subpartition_split_flag | | | | |
| | intra_luma_mpm_flag[ ][ ] | | | | |
| | intra_planar_flag[ ][ ] | | | | |
| | intra_chroma_pred_mode[ ][ ] | | | | |
| | merge_flag[ ][ ] | | | | |
| | inter_pred_idc[ x0 ][ y0 ] | | | | |
| | inter_affine_flag[ ][ ] | | | | |
| | cu_affine_type_flag[ ][ ] | | | | |
| | ref_idx_l0[ ][ ] | | | | |
| | mvp_l0_flag[ ][ ] | | | | |
| | ref_idx_l1[ ][ ] | | | | |
| | mvp_l1_flag[ ][ ] | | | | |
| | avmr_flag[ ][ ] | | | | |
| | amvr_precision_flag[ ][ ] | | | | |
| | gbi_idx[ ][ ] | | | | |
| | cu_cbf | | | | |
| | cu_sbt_flag | | | | |
| | cu_sbt_quad_flag | | | | |
| | cu_sbt_horizontal_flag | | | | |

FIG. 27C

|  | cu_sbt_pos_flag |  |  |  |  |

Table 9.9 - Syntax elements and associated binarizations

| Syntax structure | Syntax element | Binarization | |
| --- | --- | --- | --- |
| | | Process | Input parameters |
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_subpartitions_mode_flag | FL | cMax = 1 |
| | intra_subpartition_split_flag | FL | cMax = 1 |
| | intra_luma_mpm_flag[ ][ ] | FL | cMax = 1 |
| | intra_planar_flag[ ][ ] | FL | cMax=1 |
| | intra_luma_mpm_idx[ ][ ] | TR | cMax = 4, cRiceParam = 0 |
| | intra_luma_mpm_remainder[ ][ ] | TB | cMax = 60 |
| | intra_chroma_pred_mode[ ][ ] | 9.5.3.8 | - |
| | merge_flag[ ][ ] | FL | cMax = 1 |
| | inter_pred_idc[ x0 ][ y0 ] | 9.5.3.9 | cbWidth, cbHeight |
| | inter_affine_flag[ ][ ] | FL | cMax = 1 |
| | cu_affine_type_flag[ ][ ] | FL | cMax = 1 |
| | ref_idx_l0[ ][ ] | TR | cMax = NumRefIdxActive[ 0 ] – 1, cRiceParam = 0 |
| | mvp_l0_flag[ ][ ] | FL | cMax = 1 |
| | ref_idx_l1[ ][ ] | TR | cMax = NumRefIdxActive[ 1 ] – 1, cRiceParam = 0 |
| | mvp_l1_flag[ ][ ] | FL | cMax = 1 |
| | avmr_flag[ ][ ] | FL | cMax = 1 |
| | amvr_precision_flag[ ][ ] | FL | cMax = 1 |
| | gbi_idx[ ][ ] | TR | cMax = NoBackwardPredFlag ? 4: 2 |

FIG. 27D

|  | cu_cbf | FL | cMax = 1 |
|---|---|---|---|
|  | cu_sbt_flag | FL | cMax = 1 |
|  | cu_sbt_quad_flag | FL | cMax = 1 |
|  | cu_sbt_horizontal_flag | FL | cMax = 1 |
|  | cu_sbt_pos_flag | FL | cMax = 1 |

IMAGE CODING METHOD AND APPARATUS BASED ON INTRA PREDICTION USING MPM LIST

CROSS-REFERENCE TO RELATED APPLICATIONS

Pursuant to 35 U.S.C. § 119(e), this application is a continuation of International Application PCT/KR2020/003921, with an international filing date of Mar. 23, 2020, which claims the benefit of U.S. Provisional Patent Application No. 62/822,874 filed on Mar. 23, 2019, the contents of which are hereby incorporated by reference herein in its entirety.

BACKGROUND OF THE DISCLOSURE

Field of the Disclosure

The present disclosure relates to an image coding technology, and more particularly, to an image coding method and apparatus based on intra prediction using a most probable mode (MPM) list in an image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An object of the present disclosure is to provide a method and an apparatus for enhancing image coding efficiency.

Another object of the present disclosure is to provide a method and an apparatus for enhancing the efficiency of intra prediction.

Still another object of the present disclosure is to provide a method and an apparatus for performing image coding based on intra prediction using an MPM list for a current block.

Yet another object of the present disclosure is to provide a method and an apparatus for performing intra prediction based on an MPM list based on planar flag information representing whether to determine an intra prediction mode for a current block as a planar mode.

Still yet another object of the present disclosure is to provide a method and an apparatus for configuring an MPM list for a current block.

A further object of the present disclosure is to provide a method and an apparatus for coding an MPM index.

An exemplary embodiment of the present disclosure provides an image decoding method performed by a decoding apparatus. The image decoding method includes receiving intra prediction information including at least one of most probable mode (MPM) flag information representing whether to derive an intra prediction mode for a current block based on MPM candidates for the current block or planar flag information representing whether to determine the intra prediction mode for the current block as a planar mode, deriving the intra prediction mode for the current block based on the MPM flag information and the planar flag information, deriving a predicted block for the current block based on the intra prediction mode for the current block, and generating a reconstructed picture based on the predicted block, and based on the MPM flag information representing that the intra prediction mode for the current block is derived based on the MPM candidates, the planar flag information is included in the intra prediction information.

In an exemplary embodiment, the deriving of the intra prediction mode for the current block may include deriving the intra prediction mode for the current block as the planar mode, based on the planar flag information representing that the intra prediction mode for the current block is derived as the planar mode.

In an exemplary embodiment, the intra prediction information may further include MPM index information related to one of the MPM candidates other than the planar mode among the MPM candidates for the current block. Based on the planar flag information representing that the intra prediction mode for the current block is not derived as the planar mode, the MPM index information may be included in the intra prediction information. The intra prediction mode for the current block may be derived based on the MPM index information.

In an exemplary embodiment, a total number of MPM candidates other than the planar mode among the MPM candidates for the current block may be equal to 5.

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate may be the intra prediction mode of the left neighboring block of the current block, an intra prediction mode for the 1st MPM candidate may be 2+((the intra prediction mode of the left neighboring block of the current block+61)%64), and an intra prediction mode for the 2nd MPM candidate may be 2+((the intra prediction mode of the left neighboring block of the current block−1)%64).

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller than or equal to the intra DC mode, the intra prediction mode for the 0th MPM candidate may be the intra DC mode, the intra prediction mode for the 1st MPM candidate may be a 50th intra prediction mode, the intra prediction mode for the 2nd MPM candidate may be a 18th intra prediction mode, the intra prediction mode for the 3rd MPM candidate may be a 46th intra prediction mode, and the intra prediction mode for the 4th MPM candidate may be a 54th intra prediction mode.

In an exemplary embodiment, the MPM index information may be based on a truncated rice (TR) binarization process.

In an exemplary embodiment, cMax representing a maximum value of the MPM index information may be equal to 4.

Another exemplary embodiment of the present disclosure provides a decoding apparatus which performs image decoding. The decoding apparatus includes an entropy decoder which receives intra prediction information including at least one of most probable mode (MPM) flag information representing whether to derive an intra prediction mode for a current block based on most probable mode (MPM) candidates for the current block or planar flag information representing whether to determine the intra prediction mode for the current block as a planar mode, a predictor which derives the intra prediction mode for the current block based on the MPM flag information and the planar flag information, and derives a predicted block for the current block based on the intra prediction mode for the current block, and an adder which generates a reconstructed picture based on the predicted block, and based on the MPM flag information representing that the intra prediction mode for the current block is derived based on the MPM candidates, the planar flag information is included in the intra prediction information.

In an exemplary embodiment, the predictor may derive the intra prediction mode for the current block as the planar mode, based on the planar flag information representing that the intra prediction mode for the current block is derived as the planar mode.

In an exemplary embodiment, the intra prediction information may further include MPM index information related to one of the MPM candidates other than the planar mode among the MPM candidates for the current block. Based on the planar flag information representing that the intra prediction mode for the current block is not derived as the planar mode, the MPM index information may be included in the intra prediction information, and the intra prediction mode for the current block may be derived based on the MPM index information.

In an exemplary embodiment, a total number of MPM candidates other than the planar mode among the MPM candidates for the current block may be equal to 5.

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate may be the intra prediction mode of the left neighboring block of the current block, an intra prediction mode for the 1st MPM candidate may be 2+((the intra prediction mode of the left neighboring block of the current block+61)%64), and an intra prediction mode for the 2nd MPM candidate may be 2+((the intra prediction mode of the left neighboring block of the current block−1)%64).

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller than or equal to the intra DC mode, the intra prediction mode for the 0th MPM candidate may be the intra DC mode, the intra prediction mode for the 1st MPM candidate may be a 50th MPM intra prediction mode, the intra prediction mode for the 2nd MPM candidate may be a 18th intra prediction mode, the intra prediction mode for the 3rd MPM candidate may be a 46th intra prediction mode, and the intra prediction mode for the 4th MPM candidate may be a 54th intra prediction mode.

In an exemplary embodiment, the MPM index information may be based on a truncated rice (TR) binarization process.

In an exemplary embodiment, cMax representing a maximum value of the MPM index information may be equal to 4.

Still another exemplary embodiment of the present disclosure provides an encoding method performed by an encoding apparatus. The image encoding method includes deriving an intra prediction mode for a current block, generating most probable mode (MPM) flag information representing whether to derive the intra prediction mode for the current block based on most probable mode (MPM) candidates for the current block, generating the planar flag information, based on the MPM representing that the MPM flag information is related to planar flag information representing whether to determine the intra prediction mode for the current block as a planar mode, and encoding image information including at least one of the MPM flag information or the planar flag information.

In an exemplary embodiment, based on the case where the intra prediction mode for the current block is derived as the planar mode, the planar flag information may represent that the intra prediction mode for the current block is derived as the planar mode.

In an exemplary embodiment, the intra prediction information may further include MPM index information related to one of the MPM candidates other than the planar mode among the MPM candidates for the current block. The image encoding method may further include generating the MPM index information, based on a case where the intra prediction mode for the current block is not derived as the planar mode.

In an exemplary embodiment, a total number of MPM candidates other than the planar mode among the MPM candidates for the current block may be equal to 5.

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate may be the intra prediction mode of the left neighboring block of the current block, an intra prediction mode for the 1st MPM candidate may be 2+((the intra prediction mode of the left neighboring block of the current block+61)%64), and an intra prediction mode for the 2nd MPM candidate may be 2+((the intra prediction mode of the left neighboring block of the current block−1)%64).

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller than or equal to the intra DC mode, the intra prediction mode for the 0th MPM candidate may be the intra DC mode, the intra prediction mode for the 1st MPM candidate may be a 50th intra prediction mode, the intra prediction mode for the 2nd MPM candidate may be a 18th intra prediction mode, the intra prediction mode for the 3rd MPM candidate may be a 46th intra prediction mode, and the intra prediction mode for the 4th MPM candidate may be a 54th intra prediction mode.

In an exemplary embodiment, the MPM index information may be based on a truncated rice (TR) binarization process.

In an exemplary embodiment, cMax representing a maximum value of the MPM index information may be equal to 4.

Yet another exemplary embodiment of the present disclosure provides an encoding apparatus which performs image encoding. The encoding apparatus includes a predictor which derives an intra prediction mode for a current block, and an entropy encoder which generates most probable mode (MPM) flag information representing whether to derive the intra prediction mode for the current block based on most probable mode (MPM) candidates for the current block, generates planar flag information, based on the MPM representing that the MPM flag information is related to the planar flag information representing whether to determine the intra prediction mode for the current block as a planar mode, and encodes image information including at least one of the MPM flag information or the planar flag information.

In an exemplary embodiment, based on the case where the intra prediction mode for the current block is derived as the planar mode, the planar flag information may represent that the intra prediction mode for the current block is derived as the planar mode.

In an exemplary embodiment, the intra prediction information may further include MPM index information related to one of the MPM candidates other than the planar mode among the MPM candidates for the current block. The encoding apparatus may generate the MPM index information, based on a case where the intra prediction mode for the current block is not derived as the planar mode.

In an exemplary embodiment, a total number of MPM candidates other than the planar mode among the MPM candidates for the current block may be equal to 5.

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate may be the intra prediction mode of the left neighboring block of the current block, an intra prediction mode for the 1st MPM candidate may be 2+((the intra prediction mode of the left neighboring block of the current block+61)%64), and an intra prediction mode for the 2nd MPM candidate may be 2+((the intra prediction mode of the left neighboring block of the current block−1)%64).

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller than or equal to the intra DC mode, the intra prediction mode for the 0th MPM candidate may be the intra DC mode, the intra prediction mode for the 1st MPM candidate may be a 50th intra prediction mode, the intra prediction mode for the 2nd MPM candidate may be a 18th intra prediction mode, the intra prediction mode for the 3rd MPM candidate may be a 46th intra prediction mode, and the intra prediction mode for the 4th MPM candidate may be a 54th intra prediction mode.

In an exemplary embodiment, the MPM index information may be based on a truncated rice (TR) binarization process, and cMax representing a maximum value of the MPM index information may be equal to 4.

Still yet another exemplary embodiment of the present disclosure provides a decoder readable storage medium which stores information on instructions which cause a video decoding apparatus to perform decoding methods according to some exemplary embodiments.

A further exemplary embodiment of the present disclosure provides a computer readable storage medium including encoded information which causes a decoding apparatus to perform an image decoding method. The image decoding method includes receiving intra prediction information including at least one of most probable mode (MPM) flag information representing whether to derive an intra prediction mode for a current block based on most probable mode (MPM) candidates for the current block or planar flag information representing whether to determine the intra prediction mode for the current block as a planar mode, deriving the intra prediction mode for the current block based on the MPM flag information and the planar flag information, deriving a predicted block for the current block based on the intra prediction mode for the current block, and generating a reconstructed picture based on the predicted block, and based on the MPM flag information representing that the intra prediction mode for the current block is derived based on the MPM candidates, the planar flag information is included in the intra prediction information.

In an exemplary embodiment, the intra prediction information may further include MPM index information related to one of the MPM candidates other than the planar mode among the MPM candidates for the current block. Based on the planar flag information representing that the intra prediction mode for the current block is not derived as the planar mode, the MPM index information may be included in the intra prediction information, and the intra prediction mode for the current block may be derived based on the MPM index information.

In an exemplary embodiment, a total number of MPM candidates other than the planar mode among the MPM candidates for the current block may be equal to 5.

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate may be the intra prediction mode of the left neighboring block of the current block, an intra prediction mode for the 1st MPM candidate may be 2+((the intra prediction mode of the left neighboring block of the current block+61)%64), and an intra prediction mode for the 2nd MPM candidate may be 2+((the intra prediction mode of the left neighboring block of the current block−1)%64).

In an exemplary embodiment, the MPM index information may represent a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller or equal to the intra DC mode, the intra prediction mode for the 0th MPM candidate may be the intra DC mode, the intra prediction mode for the 1st MPM candidate may be a 50th intra prediction mode, the intra prediction mode for the 2nd MPM candidate may be a 18th intra prediction mode, the intra prediction mode for the 3rd MPM candidate may be a 46th intra prediction mode, and the intra prediction mode for the 4th MPM candidate may be a 54th intra prediction mode.

In an exemplary embodiment, the MPM index information may be based on a truncated rice (TR) binarization process.

In an exemplary embodiment, cMax representing a maximum value of the MPM index information may be equal to 4.

According to the present disclosure, it is possible to enhance overall image/video compression efficiency.

According to the present disclosure, it is possible to enhance the efficiency of intra prediction.

According to the present disclosure, it is possible to efficiently perform intra prediction based on an MPM list.

According to the present disclosure, it is possible to enhance image coding efficiency based on intra prediction using an MPM list for a current block.

According to the present disclosure, it is possible to enhance the efficiency of intra prediction based on an MPM list based on planar flag information representing whether to determine an intra prediction mode for a current block as a planar mode.

According to the present disclosure, it is possible to efficiently configure an MPM list for a current block.

According to the present disclosure, it is possible to efficiently code an MPM index.

BRIEF DESCRIPTION OF THE DRAWINGS

FIGS. 16A-16B shows Table 9 illustrating an algorithm (or specification) on which a decoding process for a coding unit which is coded in an intra prediction mode may be based according to an exemplary embodiment.

FIGS. 17A-17C shows Table 10 illustrating an algorithm (or specification) on which a process for deriving a luma intra prediction mode may be based according to an exemplary embodiment.

FIGS. 18A-18B shows Table 13 illustrating an algorithm (or specification) on which an intra planar mode, an intra DC mode, and the like may be based according to an exemplary embodiment.

FIGS. 19A-19C shows Table 14 illustrating an algorithm (or specification) on which a process for transforming scaled transform coefficients and the like may be based according to an exemplary embodiment.

FIGS. 20A-20B shows Table 18 illustrating an algorithm (or specification) on which a decoding process for coding units which are coded in an intra prediction mode may be based according to an exemplary embodiment.

FIGS. 21A-21C shows Table 19 illustrating an algorithm (or specification) on which a derivation process for a luma intra prediction mode may be based according to an exemplary embodiment.

FIGS. 22A-22B shows Table 22 illustrating an algorithm (or specification) on which an intra planar mode, an intra DC mode, and the like may be based according to an exemplary embodiment.

FIGS. 23A-23D shows Table 23 illustrating an algorithm (or specification) on which a process for transforming scaled transform coefficients and the like may be based according to an exemplary embodiment.

FIGS. 24-24B shows Table 27 illustrating an algorithm (or specification) on which a process for decoding a coding unit which is coded in an intra prediction mode may be based according to an exemplary embodiment.

FIGS. 25A-25D shows Table 28 illustrating an algorithm (or specification) on which a process for decoding a luma intra prediction mode may be based according to an exemplary embodiment.

FIGS. 26A-26B shows Table 31 illustrating an algorithm (or specification) on which an intra planar mode, an intra DC mode, and the like may be based according to an exemplary embodiment.

FIGS. 27A-27D shows Table 32 illustrating an algorithm (or specification) on which a process for transforming a scaled transform coefficients and the like may be based according to an exemplary embodiment.

DESCRIPTION OF EXEMPLARY EMBODIMENTS

Figure 1:
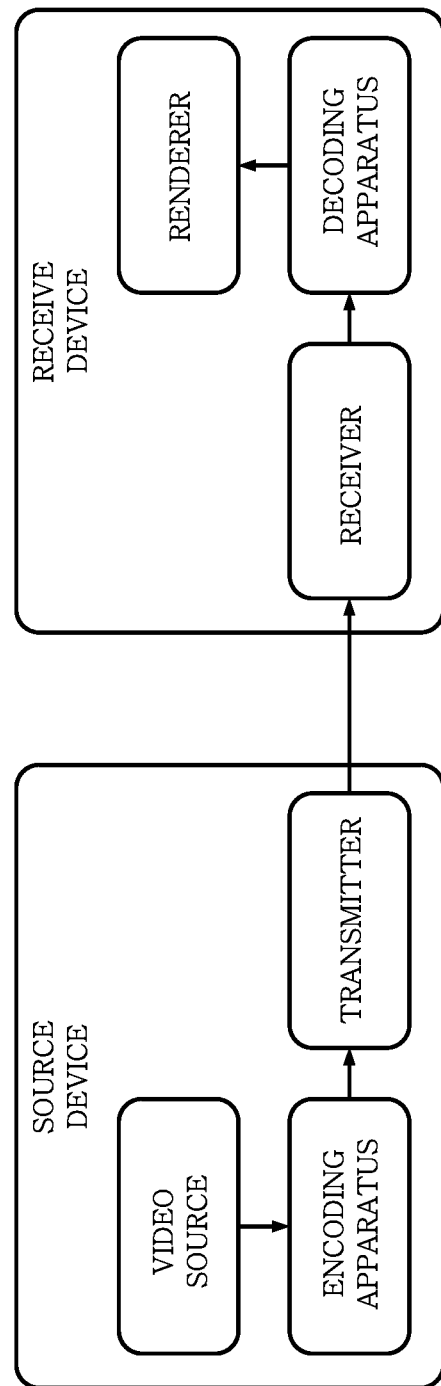
FIG. 1 schematically represents an example of a video/image coding system to which the present disclosure may be applied.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is just for the purpose of describing specific embodiments, and is not used with intent to limit technical idea of the present disclosure. The singular forms may include the plural forms unless the context clearly indicates otherwise. The terms such as "comprise", "include", and the like are intended to indicate that features, numbers, steps, operations, elements, components, or combinations thereof written in the following description exist, and thus should not be understood as that the possibility of existence or addition of one or more different features, numbers, steps, operations, elements, components, or combinations thereof is excluded in advance.

Meanwhile, respective configurations on the drawings described in the present disclosure are independently described for convenience of description as to characteristic functions different from each other, but do not mean that the configurations are embodied by separate hardware or software. For example, two or more configurations may be combined to form a single configuration, and one configuration may be divided into plural configurations. The embodiment having each component formed by the integration and/or the dividing will fall into the scope of the patent right of the present disclosure as long as it does not depart from the essence of the present disclosure.

Hereinafter, preferred embodiments of the present disclosure will be explained in more detail, referring to the attached drawings. Hereinafter, the same reference signs are used for the same components on the drawings, and repeated descriptions for the same components may be omitted.

FIG. 1 illustrates an example of a video/image coding system to which the present disclosure may be applied.

Referring to FIG. 1, a video/image coding system may include a first apparatus (source device) and a second apparatus (reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process for capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process for generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
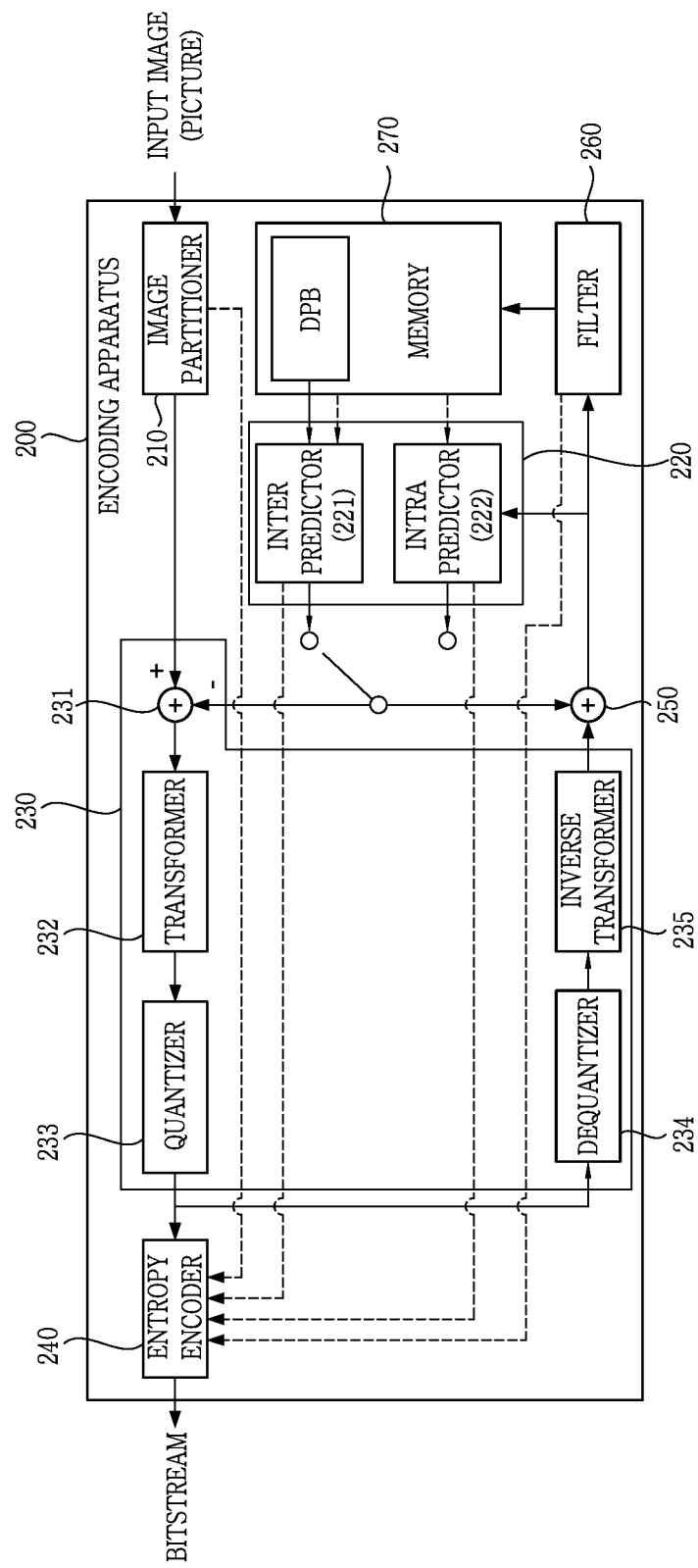
FIG. 2 is a diagram schematically illustrating a configuration of a video/image encoding apparatus to which the present disclosure may be applied.

FIG. 2 illustrates a structure of a video/image encoding apparatus to which the present disclosure may be applied. In what follows, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconfigureor or a reconstructed block generator. The image partitioner 210, the predictor 220, the residual processor 230, the entropy encoder 240, the adder 250, and the filter 260 may be configured by at least one hardware component (for example, an encoder chipset or processor) according to an exemplary embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstructed, which will be described later. As another example, the processor may further include a predictor (PU) or a transform unit (TU). In this case, the predictor and the transform unit may be split or partitioned from the aforementioned final coding unit. The predictor may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève Transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstructed other than quantized transform coefficients (for example, values of syntax elements, etc.) together or separately. Encoded information (for example, encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconfigureor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstructed.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
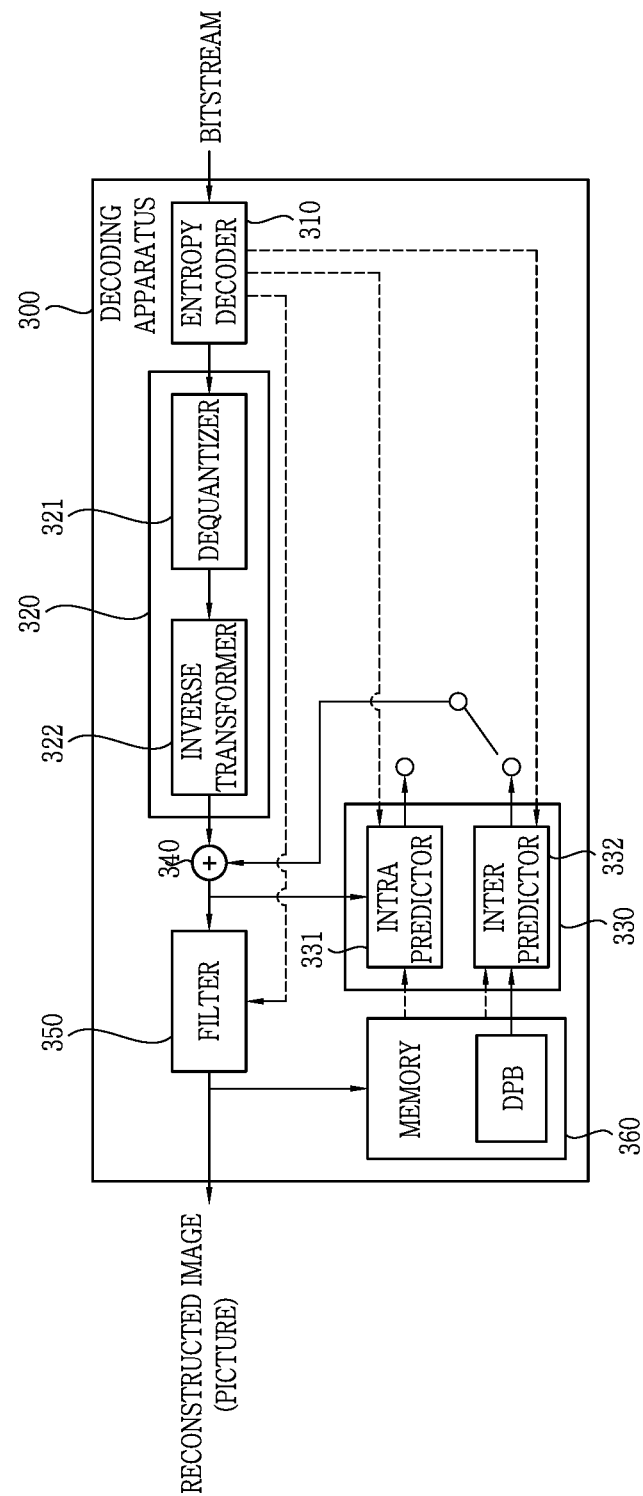
FIG. 3 is a diagram schematically illustrating a configuration of a video/image decoding apparatus to which the present disclosure may be applied.

FIG. 3 illustrates a structure of a video/image decoding apparatus to which the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (for example, a decoder chipset or a processor) according to an exemplary embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconfigure an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (for example, video/image information) necessary for image reconstructed (or picture reconstructed). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstructed and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (for example, quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconfigureor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, prediction is performed to enhance compression efficiency. Accordingly, a predicted block including prediction samples for a current block, which is a block to be coded, may be generated. Here, the predicted block includes prediction samples in a spatial domain (or pixel domain). The predicted block is derived equally from an encoding apparatus and a decoding apparatus, and the encoding apparatus may signal information about the residual (residual information) between the original block and the predicted block, rather than an original sample value of the original block itself to the decoding apparatus, thereby enhancing image coding efficiency. The decoding apparatus may derive a residual block including residual samples based on the residual information, generate a reconstructed block including reconstructed samples by combining the residual block and the predicted block, and generate a reconstructed picture including the reconstructed blocks.

The residual information may be generated through a transform and quantization procedure. For example, the encoding apparatus may signal the related residual information (through the bitstream) to the decoding apparatus by deriving the residual block between the original block and the predicted block, deriving transform coefficients by performing a transform procedure for residual samples (residual sample array) included in the residual block, and deriving quantized transform coefficients by performing a quantization procedure for the transform coefficients. Here, the residual information may include information, such as value information, location information, a transform technique, a transform kernel, and quantization parameters, of the quantized transform coefficients. The decoding apparatus may perform a dequantization/inverse transform procedure based on the residual information and derive the residual samples (or residual blocks). The decoding apparatus may generate a reconstructed picture based on the predicted block and the residual block. The encoding apparatus may also derive the residual bock by dequantizing/inverse transforming the quantized transform coefficients for reference for inter prediction of a next picture, and generate the reconstructed picture based on the derived residual block.

Figure 4A:
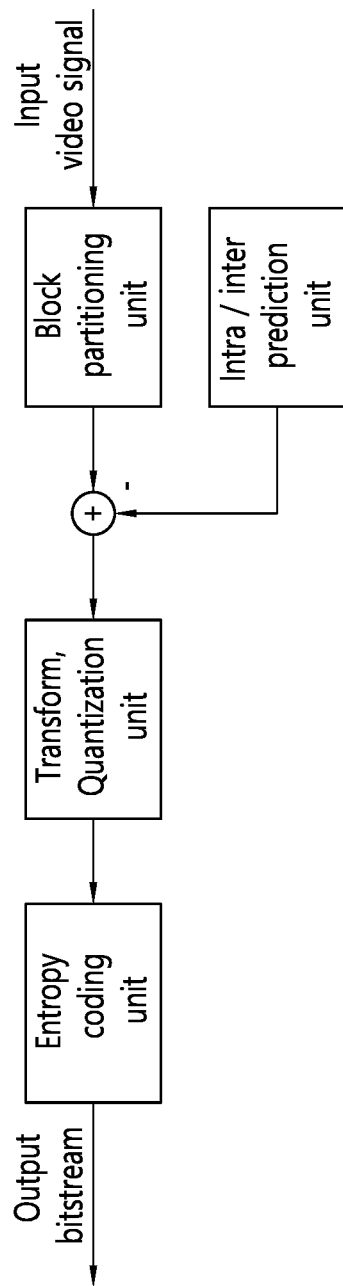
FIGS. 4A and 4B are diagrams illustrating an example of an image encoding method performed by an encoding apparatus according to an exemplary embodiment and an example of an image decoding method performed by a decoding apparatus according to an exemplary embodiment.
Figure 4B:
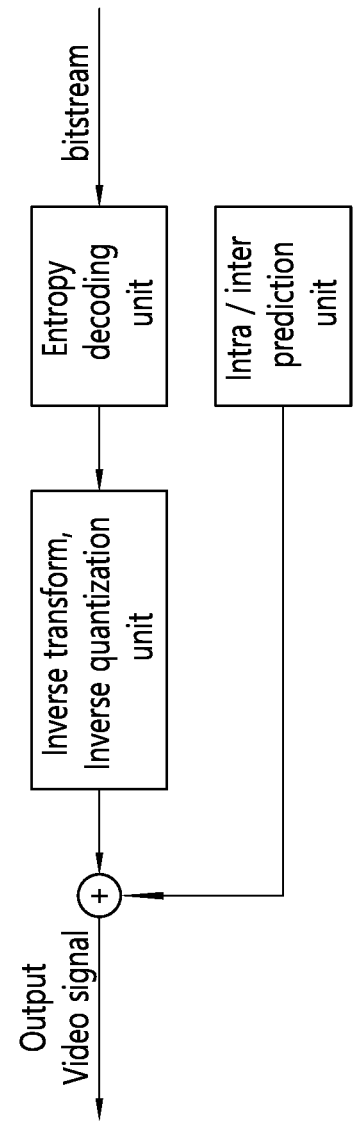

FIGS. 4A and 4B are diagrams illustrating an example of an image encoding method performed by an encoding apparatus according to an exemplary embodiment and an example of an image decoding method performed by a decoding apparatus according to an exemplary embodiment.

FIG. 4A illustrates an example of an image encoding method performed by a video encoding apparatus. Referring to FIG. 4A, the image encoding method may include block partitioning, intra/inter prediction, transform, quantization, and entropy encoding processes. For example, the current picture may be split into a plurality of blocks, a predicted block of the current block may be generated through intra/inter prediction, and the residual block of the current block may be generated by subtracting the predicted block from an input block of the current block. Thereafter, a coefficient block of the current block, that is, the transform coefficients, may be generated through the transform for the residual block. The transform coefficients may be quantized and entropy encoded and stored in a bitstream.

FIG. 4B illustrates an example of an image decoding method performed by a decoding apparatus. Referring to FIG. 4B, the image decoding method may include entropy decoding, dequantization, inverse transform, and intra/inter prediction processes. For example, the decoding apparatus may perform an inverse process for the encoding method. Specifically, quantized transform coefficients may be acquired through entropy decoding for the bitstream, and the coefficient block of the current block, that is, the transform coefficients, may be acquired through a dequantization process for the quantized transform coefficients. The residual block of the current block may be derived through the inverse transform for the transform coefficients, and the reconstructed block of the current block may be derived by adding the predicted block of the current block derived through the intra/inter prediction and the residual block.

Figure 5:
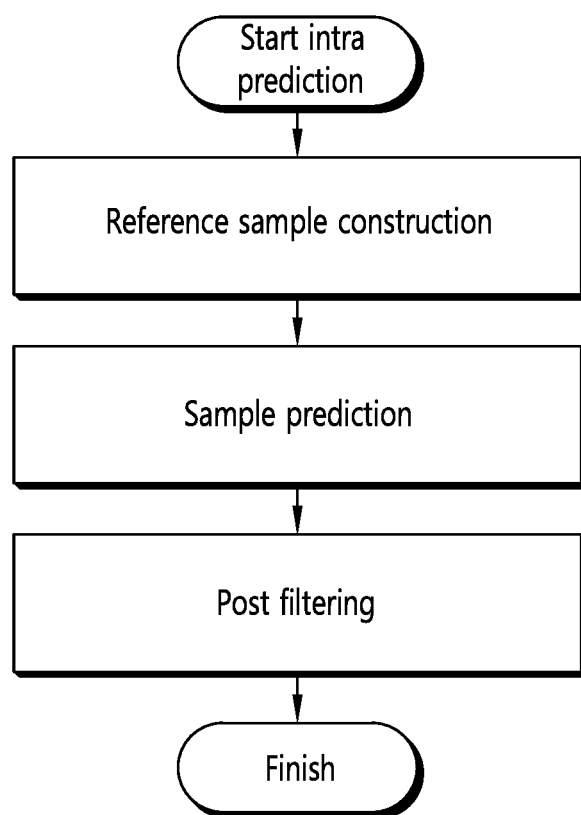
FIG. 5 is a flowchart illustrating an intra prediction method according to an exemplary embodiment.

FIG. 5 is a flowchart illustrating an intra prediction method according to an exemplary embodiment.

As illustrated in FIG. 5, the intra prediction method according to an exemplary embodiment may include the following three steps. That is, the intra prediction method according to an exemplary embodiment may include configuring a reference sample, predicting a sample, and performing a post-filtering. In the predicting of the sample, the intra prediction method according to the exemplary embodiment may use known neighboring reference samples and intra prediction mode to perform the prediction for unknown samples.

Figure 6:
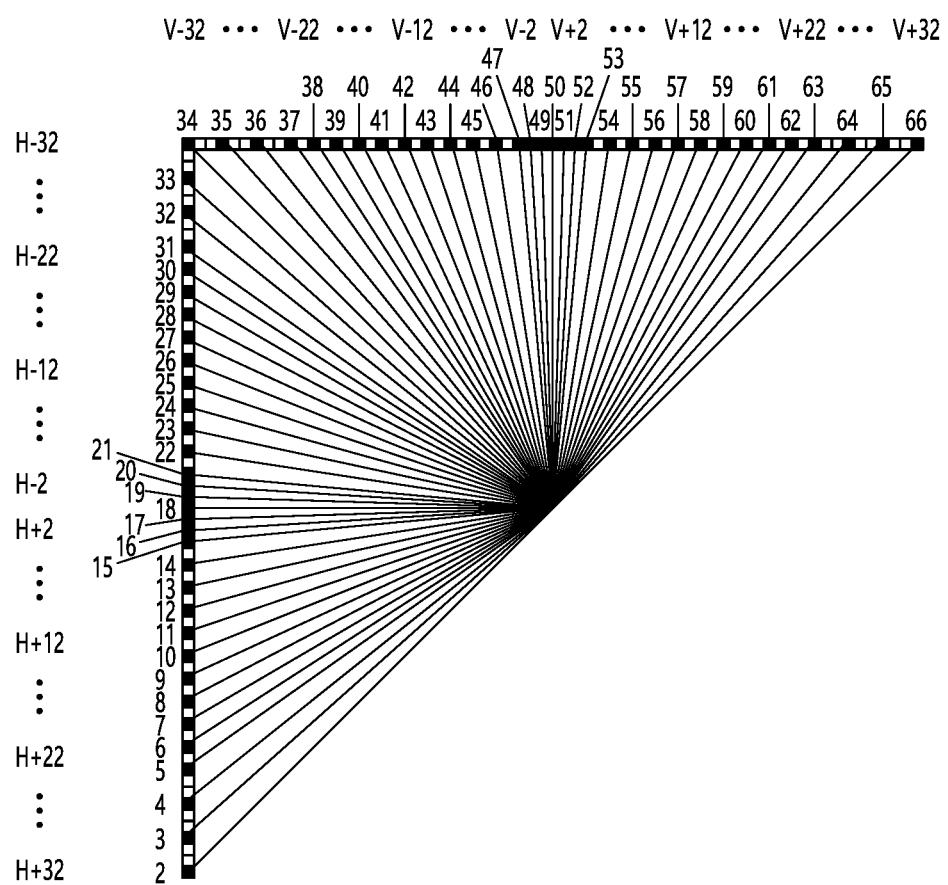
FIG. 6 is a diagram illustrating an example of directional intra prediction modes.

FIG. 6 is a diagram illustrating an example of directional intra prediction modes.

When the intra prediction is applied to the current block, the encoding apparatus and/or the decoding apparatus according to an exemplary embodiment may derive an intra prediction mode for the current block, and derive prediction samples for the current block based on the intra prediction mode. That is, the encoding apparatus and/or the decoding apparatus may derive the prediction samples for the current block by applying a directional intra prediction mode or a non-directional intra prediction mode based on the neighboring reference samples of the current block.

In an example, the intra prediction modes may include two non-directional (or non-angular) intra prediction modes and 65 directional (or angular) intra prediction modes. The non-directional intra prediction modes may include a 0th planar intra prediction mode and a first DC intra prediction mode, and the directional intra prediction modes may include 65 intra prediction modes including second to 66th intra prediction modes. The intra prediction based on the 65 directional intra prediction modes may be applied to blocks of all sizes, and may be applied to all of a luma component and a chroma component. However, this is only illustrative, and configurations of the intra prediction modes may be different.

Alternatively, the intra prediction mode may include two non-directional intra prediction modes and 129 directional intra prediction modes. The non-directional intra prediction modes may include a planar intra prediction mode and a DC intra prediction mode, and the directional intra prediction modes may include the second to 130th intra prediction modes.

Meanwhile, the intra prediction mode may further include a cross-component linear model (CCLM) mode for a chroma sample in addition to the aforementioned intra prediction modes. The CCLM mode may be classified into LT_CCLM, L_CCLM, and T_CCLM depending upon whether to consider the left samples, to consider the upper samples, or to consider both for deriving LM parameters, and may be applied only to the chroma component.

The intra prediction mode may be indexed, for example, as expressed in Table 1 below.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Meanwhile, the intra prediction type (or an additional intra prediction mode or the like) may include at least one among the aforementioned LIP, PDPC, MRL, and ISP. The intra prediction type may be indicated based on the intra prediction type information, and the intra prediction type information may be implemented in various forms. In an example, the intra prediction type information may include intra prediction type index information indicating one of the intra prediction types. In another example, the intra prediction type information may include at least one among reference sample line information (for example, intra_luma_ref_idx) representing whether the MRL is applied to the current block and if applied, which reference sample line is used, ISP flag information (for example, intra_subpartitions_mode_flag) representing whether the ISP is applied to the current block, ISP type information (for example, intra_subpartitions_split_flag) indicating that sub-partitions indicate the split type if the ISP is applied, flag information representing whether the PDPC is applied, and flag information representing whether the LIP is applied.

Referring to FIG. 6, an intra prediction mode which has horizontal directionality and an intra prediction mode which has vertical directionality may be distinguished from each other based on the 34th intra prediction mode which has a left upward diagonal prediction direction. The H and V in FIG. 6 refer to the horizontal directionality and the vertical directionality, respectively, and numbers from −32 to 32 represent displacements in units of 1/32 on a sample grid position. The second to 33th intra prediction modes have the horizontal directionality, and the 34th to 66th intra prediction modes have the vertical directionality. The 18th intra prediction mode and the 50th intra prediction mode represent a horizontal intra prediction mode and a vertical intra prediction mode, respectively, and the second intra prediction mode may be referred to as a left downward diagonal intra prediction mode, the 34th intra prediction mode may be referred to as a left upward diagonal intra prediction mode, and the 66th intra prediction mode may be referred to as a right upward diagonal intra prediction mode.

Generally, when the block for the image is split, the current block to be coded and the neighboring blocks have similar image characteristics. Accordingly, there is a high probability that the current block and the neighboring blocks have the same or similar intra prediction modes. Accordingly, the encoder may use the intra prediction mode of the neighboring block to encode the intra prediction mode of the current block.

In a more specific example, the decoding apparatus may derive the most probable mode (MPM) list based on the intra prediction mode and additional candidate modes of a neighboring block (for example, a left neighboring block and/or an upper neighboring block) of the current block, select one of the MPM candidates within the derived MPM list based on the received MPM index, or select one of the remaining intra prediction modes not included in the MPM candidates based on the remaining intra prediction mode information. The MPM list may also be represented as an intra prediction mode candidate list, and may also be represented as a candModeList.

The encoding apparatus (or encoder) may confirm or derive a prediction mode of a neighboring block if the neighboring block is intra coded. For example, the prediction mode of the current block may be determined based on the prediction mode of the left neighboring block and the prediction mode of the upper neighboring block, and at this time, the prediction mode of the corresponding neighboring block may be determined as the most probable mode (MPM). The determination of the MPM may also be expressed as listing up the most probable mode (MPM) candidates (or MPM list).

The encoding apparatus may confirm whether the prediction mode of the left neighboring block and the prediction mode of the upper neighboring block are the same. An initial MPM list may be formed by performing a pruning process for the intra prediction modes of the two adjacent blocks.

If the prediction mode of the left neighboring block and the prediction mode of the upper neighboring block are not the same, the first MPM may be set as the prediction mode of the left neighboring block, the second MPM may be set as the prediction mode of the upper neighboring block, and the third MPM may be set as any one of an intra planar mode, an intra DC mode, or an intra vertical mode (50th intra prediction mode). Specifically, when the intra prediction modes of the two neighboring blocks are different from each other, the two intra prediction modes may be set as the MPM, and after the pruning check by the MPMs, one of the default intra modes may be added to the MPM list. Here, the default intra modes may include an intra planar mode, an intra DC mode, and/or an intra vertical mode (50th intra prediction mode).

In an example, the MPM list may include 3 MPM candidates, 5 candidates, or 6 MPM candidates. For example, the MPM list may include candidates which are derived based on the intra prediction mode of the neighboring block, the derived intra prediction mode, and/or the default intra prediction mode. The encoding apparatus/decoding apparatus may search for the neighboring blocks of the current block according to a specific order, and derive the intra prediction mode of the neighboring blocks as the MPM candidates in the derived order. For example, the neighboring blocks may include a left neighboring block, an upper neighboring block, a lower left neighboring block, an upper right neighboring block, and an upper left neighboring block.

In an example, the MPM list including three MPM candidates may be configured, and the three MPM candidates may be derived based on the intra prediction modes of a neighboring block (F) and a neighboring block (G). A MPM prediction method based on the neighboring blocks for the current block including the neighboring block (F) and the neighboring block (G) may be, for example, illustrated in FIG. 7 below.

Figure 7:
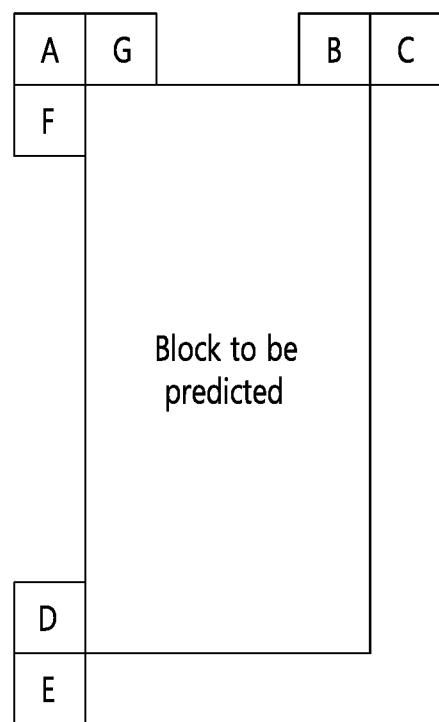
FIG. 7 is a diagram for explaining a configuration of an MPM list according to an exemplary embodiment.

FIG. 7 is a diagram for explaining a configuration of an MPM list according to an exemplary embodiment.

Referring to FIG. 7, neighboring blocks of the current block may include a neighboring block (A), a neighboring block (B), a neighboring block (C), a neighboring block (D), a neighboring block (E), a neighboring block (F), and/or a neighboring block (G).

Here, the neighboring block (A) may represent the neighboring block which is positioned in the top-left of the top-left sample position of the current block, the neighboring block (B) may represent the neighboring block which is positioned at the top of the top-right sample position of the current block, the neighboring block (C) may represent the neighboring block which is positioned at the top-right of the top-right sample position of the current block, the neighboring block (D) may represent the neighboring block which is positioned at the left end of the bottom-left sample position of the current block, the neighboring block (E) may represent the neighboring block which is positioned at the bottom-left of the bottom-left sample position of the current block, the neighboring block (G) may represent the neighboring block which is positioned at the top of the top-left sample position of the current block, and the neighboring block (F) may represent the neighboring block which is positioned at the left end of the top-left sample position of the current block.

Further, for example, if the size of the current block is W×H, the x component of the top-left sample position of the current block is 0, and the y component thereof is 0, the neighboring block (A) may be a block including a sample of (−1, −1) coordinates, the neighboring block (B) may be a block including a sample of (W−1, −1) coordinates, the neighboring block (C) may be a block including a sample of (W, −1) coordinates, the neighboring block (D) may be a block including a sample of (−1, H−1) coordinates, the neighboring block (E) may be a block including a sample of (−1, H) coordinates, the neighboring block (F) may be a block including a sample of (−1, 0) coordinates, and the neighboring block (G) may be a block including a sample of (0, −1) coordinates.

In an exemplary embodiment, three MPM candidates may be derived based on the intra prediction mode of the neighboring block (F) and the intra prediction mode of the neighboring block (G). For example, the intra prediction mode of the neighboring block (F) and the intra prediction mode of the neighboring block (G) may be derived. Meanwhile, in the following three cases, the intra prediction mode of the neighboring block (F) or the intra prediction mode of the neighboring block (G) may be derived as a DC intra prediction mode. That is, if the neighboring block (F) or the neighboring block (G) is not available, if the neighboring block (F) or the neighboring block (G) is not coded in the intra prediction mode (if the neighboring block (F) or the neighboring block (G) is not the intra coded block), or if the neighboring block (F) or the neighboring block (G) is out of the current coding tree unit, the intra prediction mode of the neighboring block (F) or the intra prediction mode of the neighboring block (G) may be derived as a DC intra prediction mode.

If the intra prediction mode of the neighboring block (F) or the intra prediction mode of the neighboring block (G) is determined, the three MPM candidates may be derived, for example, based on Table 2 below.

TABLE 2 if (intra mode of F and G are equal)
{
  if (intra mode of F < intra mode 2)
  { MPM list1 }
  else TABLE 2-continued

```
   { MPM list2 }
}
else
{
   if (Neither intra mode of F nor G are intra mode Planar)
   { MPM list3 }
   else if (intra mode of (F+G) <intra mode 2)
   { MPM list4 }
   else
   { MPM list5 }
}
```

Table 2 may exemplarily represent pseudo codes configuring the MPM list.

Referring to Table 2, it may be determined whether the intra prediction mode of the neighboring block (F) and the intra prediction mode of the neighboring block (G) are the same.

If the intra prediction mode of the neighboring block (F) and the intra prediction mode of the neighboring block (G) are the same and the mode number of the intra prediction mode of the neighboring block (F) is smaller than 2, the MPM list of the current block may be derived as a MPM list 1 (MPM list1). That is, if the intra prediction mode of the neighboring block (F) and the intra prediction mode of the neighboring block (G) are the same and the intra prediction mode of the neighboring block (F) is the 0th intra prediction mode or the first intra prediction mode, the MPM list of the current block may be derived as the MPM list 1. Here, the MPM list 1 may represent an MPM list composed of MPM candidates {F, F−1, F+1}. The F may represent the intra prediction mode of the neighboring block (F), the F−1 may represent the intra prediction mode in which a value obtained by subtracting 1 from the mode number of the intra prediction mode of the neighboring block (F) is a mode number, and the F+1 may represent the intra prediction mode in which a value obtained by adding 1 to the mode number of the intra prediction mode of the neighboring block (F) is a mode number. For example, if the intra prediction mode of the neighboring block (F) is an Nth intra prediction mode, the MPM list 1 may be configured as the MPM list including the Nth intra prediction mode, an N−1th intra prediction mode, and an N+1th intra prediction mode as the MPM candidates.

Further, if the intra prediction mode of the neighboring block (F) and the intra prediction mode of the neighboring block (G) are the same, and the mode number of the intra prediction mode of the neighboring block (F) is not smaller than 2, the MPM list of the current block may be derived as an MPM list 2.

Further, if the intra prediction mode of the neighboring block (F) and the intra prediction mode of the neighboring block (G) are not the same, and the intra prediction mode of the neighboring block (F) and the intra prediction mode of the neighboring block (G) are not planar intra prediction modes, the MPM list of the current block may be derived as an MPM list 3.

Further, if the intra prediction mode of the neighboring block (F) and the intra prediction mode of the neighboring block (G) are not the same and the sum of the mode number of the intra prediction mode of the neighboring block (F) and the mode number of the intra prediction mode of the neighboring block (G) is smaller than 2, the MPM list of the current block may be derived as an MPM list 4.

Further, if the intra prediction mode of the neighboring block (F) and the intra prediction mode of the neighboring block (G) are not the same, at least one of the intra prediction mode of the neighboring block (F) and the intra prediction mode of the neighboring block (G) is the planar intra prediction mode, and the sum of the mode number of the intra prediction mode of the neighboring block (F) and the mode number of the intra prediction mode of the neighboring block (G) is not smaller than 2, the MPM list of the current block may be derived as an MPM list 5.

Meanwhile, as the number of intra prediction modes increases, the number of MPM candidates needs to increase. Accordingly, the number of MPM candidates may vary according to the number of intra prediction modes. Generally, as the number of intra prediction modes increases, the number of MPM candidates may increase. However, the number of MPM candidates does not always increase when the number of intra prediction modes increases. For example, if there are 35 intra prediction modes or 67 intra prediction modes, there may have various MPM candidates such as 3, 4, 5, and 6 according to the design.

For example, the encoder/decoder may also configure an MPM list including 6 MPMs. Default intra modes, neighboring intra modes and derived intra modes may be considered to configure the MPM list.

In an example, for the neighboring intra modes, two neighboring blocks, that is, the left neighboring block (A) and the top neighboring block (B). In order to generate an MPM list including the 6 MPMs, an initialized default MPM list based on Table 3 below may be considered.

TABLE 3

Default 6 MPM modes = {A, Planar (0) or DC (1), Vertical (50), HOR (18), VER − 4 (46), VER + 4 (54)}
After that 6 MPM modes are updated performing pruning process for two neighboring intra modes. If two neighboring modes are the same each other and the neighboring mode is greater than DC (1) mode, 6 MPM modes are to include three default modes (A, Planar, DC) and three derived modes which are obtained by adding predefined offset values to the neighboring mode and performing modular operation. Otherwise, if two neighboring modes are different, two neighboring modes are assigned to first two MPM modes and the rest four MPM modes are derived from default modes and neighboring modes. During 6 MPM list generation process, pruning is used to remove duplicated modes so that only unique modes can be included into the MPM list. For entropy coding of the 61 non-MPM modes, a Truncated Binary Code (TBC) is used.

In another example, the order of configuring the 6 MPM candidates may be the order of the neighboring block (D), the neighboring block (B), the planar intra prediction mode, the DC intra prediction mode, the neighboring block (E), the neighboring block (C), and the neighboring block (A). That is, the intra prediction mode may be derived, as the MPM candidates, in the order of the intra prediction mode of the neighboring block (D), the intra prediction mode of the neighboring block (B), the planar intra prediction mode, the DC intra prediction mode, the intra prediction mode of the neighboring block (E), the intra prediction mode of the neighboring block (C), and the intra prediction mode of the neighboring block (A), and may not be derived as the MPM candidates if the 6 MPM candidates are the same as the already derived intra prediction mode.

Further, if the MPM list does not include the maximum number of MPM candidates, that is, if the number of derived MPM candidates is smaller than the maximum number of candidates, the directional intra prediction mode adjacent to the derived MPM candidate and a predefined default intra prediction mode may be considered as MPM candidates, and the pruning check process may be performed together. Here, the directional intra prediction mode adjacent to the MPM candidate may represent an intra prediction mode having a mode number adjacent to that of the MPM candidate. The aforementioned neighboring block search and continuous pruning check have an advantage of reducing a bit transmission rate, but may increase the number of hardware operation cycles for the configuration of the MPM list of each block. As the worst scenario, a 3840×2160 4K image may be divided into 4×4 sized blocks for the intra prediction, and the increased number of hardware operating cycles for each 4×4 sized block may be considered important for throughput. Meanwhile, if the neighboring block coded by the inter prediction of the current block knows the intra prediction mode of the neighboring block, the intra prediction mode of the neighboring block may be used to configure the MPM list.

As described above, the current block to be coded and the neighboring block may generally have similar image characteristics, and thus, there is a high probability that the current block and the neighboring block have the same or similar intra prediction modes, such that the MPM list of the current block may be determined to derive the intra prediction mode applied to the current block. However, when 67 intra prediction modes are used for the intra prediction, an MPM list including 3 MPM candidates may not be sufficient to represent diversity of multiple intra prediction modes. Further, a method for configuring a list of 6 MPMs including the neighboring block search process and the pruning check process may be disadvantageous in complexity and throughput. In the present disclosure, various methods which derive the intra prediction mode for the current block based on the MPM prediction will be described later.

Figure 8:
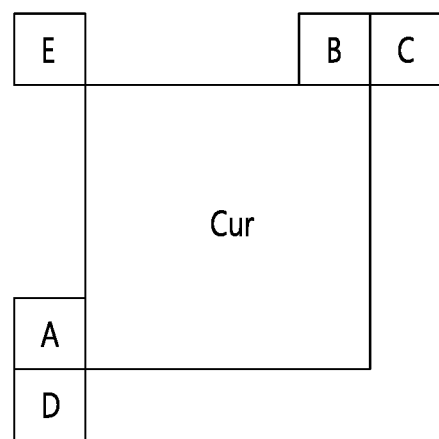
FIG. 8 is a diagram for explaining a configuration of an MPM list according to another exemplary embodiment.

FIG. 8 is a diagram for explaining a configuration of an MPM list according to another exemplary embodiment.

Referring to FIG. 8, in an exemplary embodiment, the left neighboring block (which may be represented as LEFT) A and the top neighboring block (which may be represented as ABOVE) B may be used as expressed in Table 4 below for generating the MPM list. The algorithm is as follows. The non-MPM coding may be based on a truncated binary code.

TABLE 4

Determine LEFT and ABOVE intra modes
Set MPM as MPM_ordering_0
If (LEFT==ABOVE)
  If (LEFT>=DC_idx), then set MPM as MPM_ordering_1
Else if (LEFT>DC_idx and ABOVE>DC_idx), then set MPM as MPM_ordering_2
  Else if (LEFT+ABOVE> DC_idx), then set MPM as MPM_ordering_3

Figure 9:
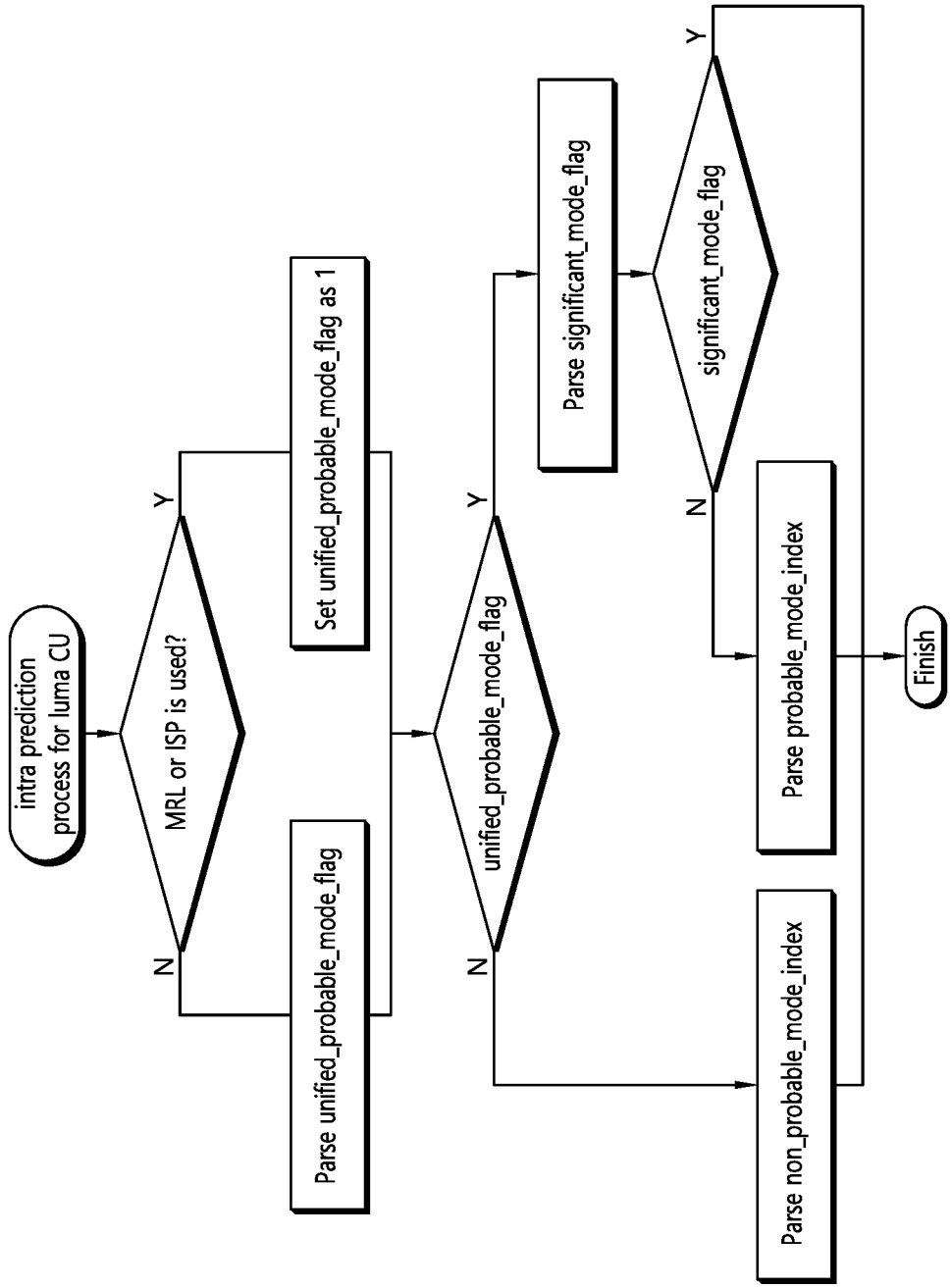
FIG. 9 is a flowchart illustrating an MPM prediction method according to an exemplary embodiment.

FIG. 9 is a flowchart illustrating an MPM prediction method according to an exemplary embodiment.

The present disclosure uses specific terms or sentences for defining specific information or concept. For example, a specific intra prediction mode which may be determined as the intra prediction mode for the current block without the MPM index information in a luma intra coding process is referred to as a "significant mode", an index indicating one of the MPM candidates included in the MPM list is referred to as an "MPM index", a flag indicating whether to apply the luma intra coding is referred to as an "integrated MPM flag", and the remaining intra prediction modes other than the MPM candidates when the MPM prediction is not applied is referred to as "non-MPM modes". However, the "significant mode" may be replaced with various terms such as a significant_mode, a default mode, and a candidate mode, the "MPM index" may be replaced with probable_mode_index, mpm_idx, intra_luma_mpm_idx, or the like, the "integrated MPM flag" may be replaced with unified_probable_mode_flag, MPM flag, intra_luma_mpm_flag, or the like, and the "non-MPM modes" may be replaced with various terms such as non-MPM modes, non_probable_modes, remaining intra prediction modes, and MPM remaining prediction modes, such that in construing specific terms or sentences used to define specific information or concept in the present specification through the specification, the construction should not be limited to the name, and it is necessary to construe the specific terms and sentences by paying attention to various operations, functions, and effects according to the content of the term.

In an example, the significant mode may be an intra planar mode.

In an exemplary embodiment, a unified luma intra coding and a signaling may be performed. In the luma intra coding, at least one significant luma intra mode may be signaled first, and then an MPM list may be configured based on the remaining intra modes to select the best mode among the MPM candidates included in the MPM list.

First, it may be determined whether an MRL or an ISP has been used. When the MRL or the ISP is used, a value of the unified_probable_mode_flag may be determined as 1. If the MRL or the ISP is not used, the unified_probable_mode_flag may be parsed.

If the value of the unified_probable_mode_flag is 0, the non_probable_mode_index may be parsed. If the value of the unified_probable_mode_flag is 1, the significant_mode_flag may be parsed. When the value of the significant_mode_flag is 1, the intra prediction mode for the current block may be determined as a significant mode (for example, intra planar mode), and when the value of the significant_mode_flag is 0, the probable_mode_index may be parsed.

Figure 10:
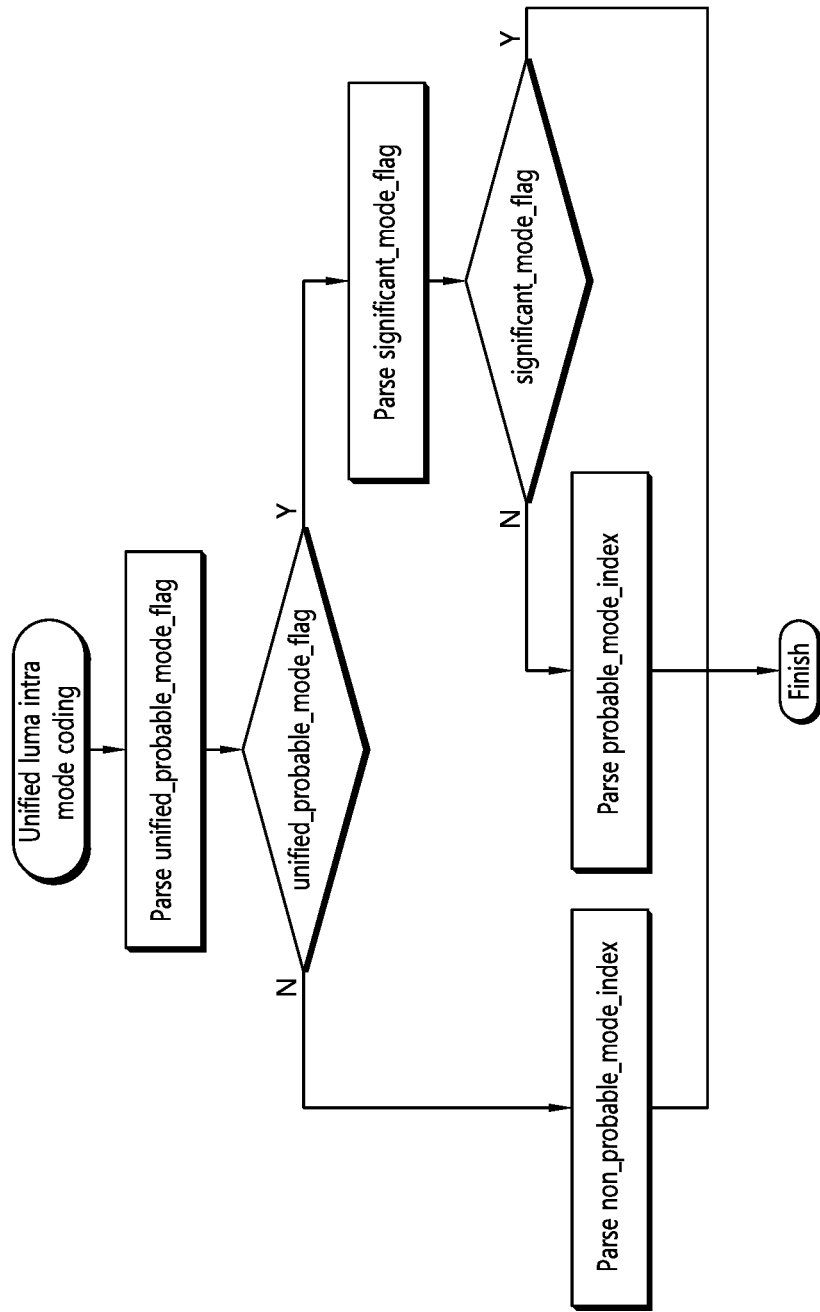
FIG. 10 is a flowchart illustrating an MPM prediction method according to another exemplary embodiment.

FIG. 10 is a flowchart illustrating an MPM prediction method according to another exemplary embodiment.

In FIG. 10, the intra prediction performed based on one integrated method (or algorithm) without depending on whether the intra prediction based on the multi-reference line (MRL) or the prediction based on the intra sub partition (ISP) is applied is referred to as an "unified luma intra mode coding". However, the "integrated luma intra mode coding" may be replaced with various terms such as an integrated luma intra mode, an integrated intra prediction, integrated MPM, an integrated MPM prediction, a unified_probable_mode, an integrated intra coding, and an integrated luma intra coding.

A specific method for deriving an integrated luma intra mode according to an exemplary embodiment is as follows.

First, the unified_probable_mode_flag may be parsed. When the value of the unified_probable_mode_flag is 0, the non_probable_mode_index may be parsed, and when the value of the unified_probable_mode_flag is 1, the significant_mode_flag may be parsed. When the value of the significant_mode_flag is 1, the intra prediction mode for the current block may be determined as a significant mode (for example, intra planar mode), and when the value of the significant_mode_flag is 0, the probable_mode_index may be parsed.

Alternatively, a specific method for deriving the integrated luma intra mode according to an exemplary embodiment may be expressed in Table 5 below.

TABLE 5

Step 1. Parse unified_probable_mode_flag or unified_probable_mode_flag is previously assigned with certain value.
If unified_probable_mode_flag equals to 1, it specifies the unified probable intra mode is used for current intra coding unit (CU). And then step 1.1 is performed.
Otherwise, unified_probable_mode_flag equals to 0, it specifies that the unified probable intra mode is not used. Instead, non_probable_mode is used for current intra CU. And then step 1.2 is performed.
    Step 1.1 Parse significant_mode_flag.
    If significant_mode_flag equals to 1, it specifies that one significant intra mode is used for current intra coding unit (CU). And then step 1.1.1 is performed. Otherwise, significant_mode_flag equals to 0, it specifies that the significant intra mode is not used. Instead, one of the probable mode in the probable list is used for current intra CU. And then step 1.1.2 is performed
        Step 1.1.1 pre-defined one significant mode is assigned to predModeIntra indicates that the one specific significant mode is used for current intra CU.

TABLE 5-continued

Step 1.1.2 Parse probable_mode_index.
        probable_mode_index is parsed to indicated that one of probable mode list is used for current intra CU. Detailed construction of probable mode list is described in following Table 6.
    Step 1.2 Parse non_probable_mode_idx
non_probable_mode_idx parsed to indicated that one of the non probable mode list is used for current intra CU A method for configuring an MPM list according to an exemplary embodiment is proposed. A list of the MPM modes having a k length may be configured. In an example, the k is equal to 5, and 5 conditions may be used when 5 different MPM lists are configured. A block (B) of FIG. 7 may be represented as A, and a block (D) may be represented as L. For example, the method for configuring the MPM list according to the present exemplary embodiment may be expressed in Table 6 below.

TABLE 6

1. Check condition 1 whether L and A are the same. If condition 1 meets, then go to step 2.1, otherwise go to step 2.2.
L == A         (condition 1)
2.
2.1 In this case, L and A are the same. Check condition 2 whether L is bigger than DC_idx which implies that L and A are both angular modes. If condition 2 meets, then go to step 5.1, otherwise go to step 5.2.
L > DC_idx         (condition 2)
2.2 In this case, L and A are different. Check condition 3 whether L or A is bigger than DC_idx, implies that at least one of the L and A is angular mode. If condition 3 meets, then go to step 3
L > DC_idx or A > DC_idx         (condition 3)
3. The following applies.
maxAB = max (L, A) which takes the bigger value between L and A.
minAB = min(L, A) which takes the smaller value between L and A
checks condition 4 whether both L and A are bigger than DC_idx which implies that both of L and A are angular modes. If condition 4 meets, then go to step 4.1, otherwise go to step 4.2.
L > DC_idx and A > DC_idx         (condition 4)
4.
4.1 In this case, both L and A are angular modes. Check condition 5 whether the difference between L and A is equal or less than 62 and equal or larger than 2. If condition 5 meets, then go to step 5.3, otherwise go to step 5.4.
The variable diff = maxAB-minAB
diff <= 62 AND diff >= 2         (condition 5)
4.2 In this case, only one of L and A is angular modes. go to step 5.5
5. Construct the whole probable mode list
5.1 Construct list 1.
mpm[0] = L
mpm[1] = L − 1
mpm[2] = L + 1
mpm[3] = DC_idx
mpm[4] = L − 2
5.2 Construct list 2
mpm[1] = DC_idx
mpm[2] = Vertical_idx
mpm[3] = Horizontal_idx
mpm[4] = Vertical_idx − 4
mpm[5] = Vertical_idx + 4
5.3 Construct list 3
mpm[0] = L
mpm[1] = A
mpm[2] = DC_idx
mpm[3] = maxAB − 1
mpm[4] = maxAB + 1
5.4 Construct list 4
mpm[0] = L
mpm[1] = A
mpm[2] = DC_idx
mpm[3] = maxAB − 2
mpm[4] = maxAB + 2
5.5 Construct list 5
mpm[0] = maxAB
mpm[1] = DC_idx
mpm[2] = maxAB − 1
mpm[3] = maxAB + 1
mpm[4] = maxAB − 2
In step 5, intra angular mode + 1, intra angular mode − 1 and intra angular mode − 2 are not simple mathematically adding or subtracting values. In some cased, by subtracting and adding angular modes, TABLE 6-continued one may become non-angular mode which break the consistency of neighbor intra mode or one may exceed the maximum available intra mode index. For instance, intra angular mode minus 1 would results intra mode 1 which is DC index. Plus one to intra angular mode 66 would results 67 which exceeds the maximum available intra mode 66. Hence, adding and subtracting bounded using modular arithmetic (denoted as %) as below.
- Intra mode − 1 is
  (Intra mode + 61)% 64 + 2
- Intra mode + 1 is
  (Intra mode − 1)% 64 + 2
- Intra mode − 2 is
  (Intra mode + 60)% 64 + 2
- Intra mode + 2 is
  (Intra mode)% 64 + 2

Meanwhile, an exemplary embodiment is not limited to performing the integrated luma intra coding only when the integrated MPM flag is signaled and the value of the signaled MPM flag is 1. For example, even without signaling the integrated MPM flag, the decoding apparatus according to an exemplary embodiment may perform the integrated luma intra coding.

In an exemplary embodiment, integrated intra prediction signaling and intra mode signaling may be combined with the configuration of the MPM list, and the non-MPM list may be configured. The present exemplary embodiment may be based on the coding unit syntax of Table 7 below.

TABLE 7

| coding_unit( x0, y0, cbWidth, cbHeight, treeType ) { | Descriptor |
|---|---|
| ... | |
|   if( treeType = = SINGLE_TREE ‖ treeType = = DUAL_TREE_LUMA ) { | |
|     if( ( y0 % CtbSizeY ) > 0 ) | |
|       intra_luma_ref_idx[ x0 ][ y0 ] | ae(v) |
|     if (intra_luma_ref_idx[ x0 ][ y0 ] = = 0 && | |
|       ( cbWidth <= MaxTbSizeY ‖ cbHeight <= MaxTbSizeY ) && | |
|       ( cbWidth * cbHeight > MinTbSizeY * MinTbSizeY )) | |
|       intra_subpartitions_mode_flag[ x0 ][ y0 ] | ae(v) |
|     if( intra_subpartitions_mode_flag[ x0 ][ y0 ] = = 1 && | |
|       cbWidth <= MaxTbSizeY && cbHeight <= MaxTbSizeY) | |
|       intra_subpartitions_split_flag[ x0 ][ y0 ] | ae(v) |
|     if( intra_luma_ref_idx[ x0 ][ y0 ] = = 0 && | |
|       intra_subpartitions_mode_flag[ x0 ][ y0 ] = = 0) | |
|       intra_luma_mpm_flag[ x0 ][ y0 ] | ae(v) |
|     if( intra_luma_mpm_flag[ x0 ][ y0 ] ) | |
|       intra_planar_flag[ x0 ][ y0 ] | ae(v) |
|         if (intra_planar_flag==0) | |
|           intra_luma_mpm_idx[ x0 ][ y0 ] | ae(v) |
|     else | |
|       intra_luma_mpm_remainder[ x0 ][ y0 ] | ae(v) |
|   } | |
| ... | |
| } | |

The coding unit syntax of Table 7 may be based on, for example, the semantics of Table 8 below.

TABLE 8 intra_luma_mpm_flag[ x0 ][ y0 ], intra_planar_flag[ x0 ][ y0 ], intra_luma_mpm_idx[ x0 ][ y0 ] and intra_luma_mpm_ remainder[ x0 ][ y0 ] specify the intra prediction mode for luma samples. The array indices x0, y0 specify the location ( x0 , y0 ) of the top-left luma sample of the considered coding block relative to the top-left luma sample of the picture. When intra_luma_mpm_flag[ x0 ][ y0 ] is equal to 1, the intra_planar_flag is parsed. When intra_planar_flag is equal to 1, it specifies that the the variable IntraPredModeY[ xCb ][ yCb ] is equal to INTRA_PLANAR. When intra_planar_flag is equal to 0, the intra prediction mode is inferred from a neighbouring intra-predicted TABLE 8-continued coding unit according to clause 8.4.2. When intra_luma_mpm_flag[ x0 ] [ y0 ] is not present, it is inferred to be equal to 1.

In an example, the decoding process for the coding unit which is coded in the intra prediction mode may be based on the algorithm (or specification) of Table 9 as shown in FIGS. 16A-16B.

In an example, the process for deriving the luma intra prediction mode may be based on the algorithm (or specification) of Table 10 as shown in FIGS. 17A-17C.

In an example, the decoding process for the intra blocks may be based on the algorithm (or specification) of Table 11 below.

TABLE 11

8.4.4.1 General decoding process for intra blocks
...
  For xPartIdx = 0..numPartsX − 1 and yPartIdx = 0..numPartsY − 1, the following applies:
The general intra sample prediction process as specified in clause 8.4.4.2.1 is invoked with the location ( xTbCmp yTbCmp ) set equal to ( xTb0 + nW * xPartIdx, yTb0 + nH * yPartIdx ), the intra prediction mode predModeIntra, the transform block width nTbW and height nTbH set equal to nW and nH, the coding block width nCbW and TABLE 11-continued height nCbH set equal to nTbW and nTbH, and the variable cIdx as inputs, and the output is an(nTbW) × (nTbH) array predSamples.

In an example, the intra sample prediction may be based on the algorithm (or specification) of Table 12 below.

TABLE 12

8.4.4.2.1 General intra sample prediction
The intra sample prediction process according to predModeIntra applies as follows:
  If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.
  Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.
  Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location ( xTbC, yTbC ) set equal to ( xTbCmp, yTbCmp ), the transform block width nTbW and height nTbH, and the reference sample array p as inputs, and the output is the predicted sample array predSamples.
  Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

In an example, the intra planar mode, the intra DC mode, and the like may be based on the algorithm (or specification) of Table 13 as shown in FIGS. 18A-18B.

In an example, a process for transforming scaled transform coefficients and the like may be based on the algorithm (or specification) of Table 14 as shown in FIGS. 19A-19C.

In an example, an example of assigning ctxInc to syntax elements including context coded bins may be based on Table 15 below.

MPM flag, and the intra_planar_flag may represent an example of a planar flag.

Referring to (8-10), (8-12), and (8-13) of Table 10, it may be confirmed that among the MPM candidates included in the MPM list, candModeList [0] is determined as candIntraPredModeA representing the intra prediction mode for the left neighboring block of the current block, candModeList [1] is determined as 2+((candIntraPredModeA+61)%64), and candModeList [2] is determined as 2+((candIntraPredModeA−1)% 64).

Referring to Table 14, it may be confirmed that cMax representing the maximum value of the intra_luma_mpm_idx is determined as 4.

An exemplary embodiment proposes a method for performing the integrated MPM prediction and a method for coding and/or signaling information about related intra prediction modes. Further, an exemplary embodiment proposes a method for deriving a transform kernel. According to an exemplary embodiment, the coding unit syntax expressed in Tables 16 to 24 below may be configured/encoded and signaled to the decoding apparatus, and the decoding apparatus may derive the intra prediction mode for the current block (CU) based on the coding unit syntax and the MPM list.

For example, according to the present exemplary embodiment, the planar mode may be included in the MPM list as a candidate mode, and when the value of the MPM flag is 1, the planar flag (intra_planar_flag) may be first signaled to indicate whether the planar mode is used as the intra prediction mode of the current block. If the value of the planar flag is 0, the MPM index (intra_luma_mpm_idx) may be signaled to indicate one of the remaining MPM candidates other than the planar mode. At this time, in an example, the MPM list including the remaining candidates other than the planar mode may be referred to as a modified MPM list.

If the total number of MPM candidates including the planar mode is 6, the total number of candidates in the modified MPM list other than the planar mode may be equal to 5, and in this case, the values of the MPM index may be 0 to 4. That is, the maximum value of the MPM index may be set as 4. At this time, the maximum value of the MPM index may be represented as cMax of the MPM index. The bin of the planar flag may be regular-coded based on a

TABLE 15

| Syntax element | binIdx | | | | | |
|---|---|---|---|---|---|---|
| | 0 | 1 | 2 | 3 | 4 | >=5 |
| intra_luma_ref_idx[ ][ ] | 0 | 1 | na | na | na | na |
| intra_subpartitions_mode_flag | 0 | na | na | na | na | na |
| intra_subpartition_split_flag | 0 | na | na | na | na | na |
| intra_luma_mpm_flag[ ][ ] | 0 | na | na | na | na | na |
| intra_planar_flag[ ][ ] | intra_luma_ref_idx! = 0 ? 2: (intra_subpartions_mode_flag? 0: 1) | na | na | na | na | na |
| intra_luma_mpm_idx[ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag == 0 | 0 | bypass | bypass | na | na | na |

Referring to Table 7, it may be confirmed that the intra_planar_flag is decoded based on the decoding result that the value of the intra_luma_mpm_flag is 1. The intra_luma_mpm_flag may represent an example of an context model as described later in Tables 16 to 24, and as described later in Tables 16 to 24, ctxInc for indicating the context model i) may use only one specific value (for example, 0), ii) may be variably derived based on whether the left neighboring block is available and/or whether the top neighboring block is available and the value of the planar flag (if available), or iii) may also have the value variably determined depending on whether the MRL or the ISP is applied. Further, the present exemplary embodiment may derive a transform kernel (vertical transform kernel/horizontal transform kernel) for the current block based on the size and/or intra prediction type/mode of the current block. For example, as described later in Tables 16 to 24, if the ISP is not applied to the current block or is not available, the transform kernel (vertical transform kernel/horizontal transform kernel) may be derived as a value of 1 or 0 further with reference to the size of the current block.

According to the present exemplary embodiment, if the MRL intra prediction is applied (that is, if the MRL index is larger than 0), the planar mode or the DC mode may be applied to the current block, and if the ISP intra prediction is also applied, the planar mode or the DC mode may be applied to the current block. Accordingly, the MPM list may be configured based on the integrated MPM prediction without depending upon whether the MRL, the ISP, or the like is applied. Tables 16 to 24 are as follows, and the details of Tables 16 to 24 will be readily understood by those skilled in the art.

Table 16 below expresses an example of the coding unit syntax.

In an example, a decoding process for the coding units which are coded in the intra prediction mode may be based on the algorithm (or specification) of Table 18 as shown in FIGS. 20A-20B.

In an example, a derivation process for the luma intra prediction mode may be based on the algorithm (or specification) of Table 19 as shown in FIGS. 21A-21C.

In an example, a process for decoding the intra blocks may be based on the algorithm (or specification) of Table 20 below.

TABLE 20

8.4.4.1 General decoding process for intra blocks
...
For xPartIdx = 0..numPartsX − 1 and yPartIdx = 0..numPartsY − 1, the following applies:
The general intra sample prediction process as specified in clause 8.4.4.2.1 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to nW and nH, the coding block width nCbW and height nCbH set equal to nTbW and nTbH, and the variable cIdx as inputs, and the output is an (nTbW) × (nTbH) array predSamples.

In an example, the intra sample prediction may be based on the algorithm (or specification) of Table 21 below.

TABLE 16

| coding_unit( x0, y0, cbWidth, cbHeight, treeType) { | Descriptor |
|---|---|
| ... | |
|   if( treeType == SINGLE_TREE \|\| treeType == DUAL_TREE_LUMA ) { | |
|     if( ( y0 % CtbSizeY ) > 0 ) | |
|       intra_luma_ref_idx[ x0 ][ y0 ] | ae(v) |
|     if (intra_luma_ref_idx[ x0][ y0 ] == 0 && | |
|       ( cbWidth <= MaxTbSizeY \|\| cbHeight <= MaxTbSizeY) && | |
|       ( cbWidth * cbHeight > MinTbSizeY * MinTbSize )) | |
|       intra_subpartitions_mode_flag[ x0 ][ y0 ] | ae(v) |
|     if( intra_subpartitions_mode_flag[ x0 ][ y0 ] == 1 && | |
|       cbWidth <= MaxTbSizeY && cbHeight <= MaxTbSizeY) | |
|       intra_subpartitions_split_flag[ x0][ y0 ] | ae(v) |
|     if( intra_luma_ref_idx[ x0 ][ y0 ] == 0 && | |
|       intra_subpartitions_mode_flag[ x0 ][ y0 ] == 0 ) | |
|       intra_luma_mpm_flag[ x0 ][ y0 ] | ae(v) |
|     if( intra_luma_mpm_flag[ x0 ][ y0 ] ) | |
|       intra_planar_flag[ x0][ y0 ] | ae(v) |
|       if (intra_planar_flag==0) | |
|         intra_luma_mpm_idx[ x0 ][ y0 ] | ae(v) |
|   Else | |
|     intra_luma_mpm_remainder[ x0 ][ y0 ] | ae(v) |
|   } | |
| ... | |
| } | |

The coding unit syntax of Table 16 may be based on, for example, the semantics of Table 17 below.

TABLE 17 intra_luma_mpm_flag[ x0 ][ y0 ], intra_planar_flag[ x0 ][ y0 ], intra_luma_mpm_idx[ x0][ y0 ] and intra_luma_mpm_remainder[ x0][ y0 ] specify the intra prediction mode for luma samples. The array indices x0, y0 specify the location ( x0 , y0 ) of the top-left luma sample of the considered coding block relative to the top-left luma sample of the picture. When intra_luma_mpm_flag[ x0 ][ y0 ] is equal to 1, the intra_planar_flag is parsed. When intra_planar_flag is equal to 1, it specifies that the the variable IntraPredModeY[ xCb ][ yCb ] is equal to INTRA_PLANAR. When intra_planar_flag is equal to 0, the prediction mode is inferred from a neighbouring intra-predicted coding unit according to clause 8.4.2. When intra_luma_mpm_flag[ x0 ][ y0 ] is not present, it is inferred to be equal to 1.

TABLE 21

8.4.4.2.1 General intra sample prediction
The intra sample prediction process according to predModeIntra applies as follows:
  If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.
  Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.
  Otherwise, if predModeIntra is equal to INTRA_LT_CCLM,

TABLE 21-continued

INTRA_L_CCLM or INTRA_T_CCLM, the corresponding intra
prediction mode process specified in clause 8.4.4.2.8 is invoked with
the intra prediction mode predModeIntra, the sample location ( xTbC,
yTbC ) set equal to ( xTbCmp, yTbCmp ), the transform block width
nTbW and height nTbH, and the reference sample array p as inputs,
and the output is the predicted sample array predSamples.
Otherwise, the corresponding intra prediction mode process specified
in clause 8.4.4.2.7 is invoked with the intra prediction mode
predModeIntra, the intra prediction reference line index refIdx, the
transform block width nTbW, the transform block height nTbH, the
reference sample width refW, the reference sample height refH, the
coding block width nCbW and height nCbH, the colour component
index cIdx, and the reference sample array p as inputs, and the
modified intra prediction mode predModeIntra and the predicted
sample array predSamples as outputs.

In an example, the intra planar mode, the intra DC mode, and the like may be based on the algorithm (or specification) of Table 22 as shown in FIGS. 22A-22B.

In an example, a process for transforming scaled transform coefficients and the like may be based on the algorithm (or specification) of Table 23 as shown in FIGS. 23A-23D.

In an example, an example of assigning ctxInc to syntax elements including context coded bins may be based on Table 24 below.

prediction mode of the current block. If the value of the planar flag is 0, the MPM index (intra_luma_mpm_idx) may be signaled to indicate one of the remaining MPM candidates other than the planar mode. At this time, in one example, the MPM list including the remaining candidates other than the planar mode may be referred to as a modified MPM list.

If a total number of MPM candidates including the planar mode is 6, the total number of candidates in the modified MPM list other than the planar mode may be equal to 5, and in this case, the values of the MPM index may be 0 to 4. That is, the maximum value of the MPM index may be set as 4. At this time, the maximum value of the MPM index may be represented as cMAX of the MPM index. The bin of the planar flag may be regular-coded based on a context model as described later in Tables 25 to 33, and as described later in Tables 25 to 33, ctxInc for indicating the context model i) may use only one specific value (for example, 0), ii) may be variably derived based on whether the left neighboring block and/or the top neighboring block are available and the value of the planar flag (if available), or iii) may also have the value variably determined depending on whether the MRL or the ISP is applied. Further, according to the present exemplary embodiment, a transform kernel (vertical trans-

TABLE 24

| Syntax element | binIdx | | | | | |
|---|---|---|---|---|---|---|
| | 0 | 1 | 2 | 3 | 4 | >=5 |
| intra_luma_ref_idx[ ][ ] | 0 | 1 | na | na | na | na |
| intra_subpartitions_mode_flag | 0 | na | na | na | na | na |
| intra_subpartition_split_flag | 0 | na | na | na | na | na |
| intra_luma_mpm_flag[ ][ ] | 0 | na | na | na | na | na |
| intra_planar_flag[ ][ ] | intra_luma_ref_idx!=0 ? 2: (intra_subpartitions_mode_flag? 0: 1) | na | na | na | na | na |
| intra_luma_mpm_idx[ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag = = 0 | 0 | bypass | bypass | na | na | na |

An exemplary embodiment proposes a method for performing the integrated MPM prediction and a method for coding and/or signaling the information about related intra prediction modes. Further, an exemplary embodiment proposes a method for deriving a transform kernel. According to an exemplary embodiment, the coding unit syntax expressed in Tables 16 to 24 may be configured/encoded and signaled to the decoding apparatus, and the decoding apparatus may derive the intra prediction mode for the current block (CU) based on the coding unit syntax and the MPM list.

For example, according to the present exemplary embodiment, the MPM list may include the planar mode as a candidate mode, and if the value of the MPM flag is 1, the planar flag (intra_planar_flag) may be first signaled to indicate whether the planar mode is used as the intra form kernel/horizontal transform kernel) for the current block may be derived based on the size and/or intra prediction type/mode of the current block. For example, as described later in Tables 25 to 33 below, if the ISP is not applied to the current block or is not available, the transform kernel (vertical transform kernel/horizontal transform kernel) may be derived as a value of 1 or 0 further with reference to the size of the current block.

According to the present exemplary embodiment, the MPM list may be configured based on the integrated MPM prediction without depending upon whether the MRL, the ISP, or the like is applied. Tables 25 to 33 are as follows, and the details of Tables 25 to 33 will be easily understood by those skilled in the art.

Table 25 below expresses an example of the coding unit syntax.

TABLE 25

| | Descriptor |
|---|---|
| coding_unit( x0, y0, cbWidth, cbHeight, treeType ) { | |
| ... | |
|   if( treeType = = SINGLE_TREE \|\| treeType = = DUAL_TREE_LUMA ) { | |
|     if( ( y0 % CtbSizeY ) > 0 ) | |

TABLE 25-continued

| | Descriptor |
|---|---|
| intra_luma_ref_idx[ x0 ][ y0 ]<br>if (intra_luma_ref_idx[ x0 ][ y0 ] = = 0 &&<br>  ( cbWidth <= MaxTbSizeY \|\| cbHeight <= MaxTbSizeY ) &&<br>  ( cbWidth * cbHeight > MinTbSizeY * MinTbSizeY ))<br>  intra_subpartitions_mode_flag[ x0 ][ y0 ] | ae(v)<br><br><br><br>ae(v) |
| if( intra_subpartitions_mode_flag[ x0 ][ y0 ] = = 1 &&<br>  cbWidth <= MaxTbSizeY && cbHeight <= MaxTbSizeY )<br>  intra_subpartitions_split_flag[ x0 ][ y0 ] | <br><br>ae(v) |
| if( intra_luma_ref_idx[ x0 ][ y0 ] = = 0 &&<br>  intra_subpartitions_mode_flag[ x0 ][ y0 ] = = 0 )<br>  intra_luma_mpm_flag[ x0 ][ y0 ]<br>if( intra_luma_mpm_flag[ x0 ][ y0 ]) {<br>  if (intra_luma_ref_idx[ x0 ][ y0 ] = = 0)<br>    intra_planar_flag[ x0 ][ y0 ]<br>  if (intra_planar_flag==0)<br>    intra_luma_mpm_idx[ x0 ][ y0 ]<br>}<br>Else<br>  intra_luma_mpm_remainder[ x0 ][ y0 ]<br>}<br>...<br>} | <br><br>ae(v)<br><br><br>ae(v)<br><br>ae(v)<br><br><br>ae(v) |

The coding unit syntax of Table 25 may be based on, for example, the semantics of Table 26 below.

TABLE 26 intra_luma_mpm_flag[ x0 ][ y0 ], intra_planar_flag[ x0 ][ y0 ], intra_luma_mpm_idx[ x0 ][ y0 ] and intra_luma_mpm_remainder[ x0 ][ y0 ] specify the intra prediction mode for luma samples. The array indices x0, y0 specify the location ( x0 , y0 ) of the top-left luma sample of the considered coding block relative to the top-left luma sample of the picture. When intra_luma_mpm_flag[ x0 ][ y0 ] is equal to 1, the intra_planar_flag is parsed. When intra_planar_flag is equal to 1, it specifies that the the variable IntraPredModeY[ xCb ][ yCb ] is equal to INTRA_PLANAR. When intra_planar_flag is equal to 0, the intra prediction mode is inferred from a neighbouring intra-predicted coding unit according to clause 8.4.2.
When intra_luma_mpm_flag[ x0 ][ y0 ] is not present, it is inferred to be equal to 1.

In an example, a process for decoding the coding unit which is coded in the intra prediction mode may be based on the algorithm (or specification) of Table 27 as shown in FIGS. 24A-24B.

In an example, a process for decoding the luma intra prediction mode may be based on the algorithm (or specification) of Table 28 as shown in FIGS. 25A-25D.

In an example, a process for decoding the intra blocks may be based on the algorithm (or specification) of Table 29 below.

TABLE 29

8.4.4.1 General decoding process for intra blocks
...
  For xPartIdx = 0..numPartsX − 1 and yPartIdx = 0..numPartsY − 1, the following applies:
The general intra sample prediction process as specified in clause 8.4.4.2.1 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to nW and nH, the coding block width nCbW and height nCbH set equal to nTbW and nTbH, and the variable cIdx as inputs, and the output is an (nTbW) × (nTbH) array predSamples.

In an example, the intra sample prediction may be based on the algorithm (or specification) of Table 30 below.

TABLE 30

8.4.4.2.1 General intra sample prediction
The intra sample prediction process according to predModeIntra applies as follows:
  If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.
  Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.
  Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location ( xTbC, yTbC ) set equal to ( xTbCmp, yTbCmp ), the transform block width nTbW and height nTbH, and the reference sample array p as inputs, and the output is the predicted sample array predSamples.
  Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

In an example, the intra planar mode, the intra DC mode, and the like may be based on the algorithm (or specification) of Table 31 as shown in FIGS. 26A-26B.

In an example, a process for transforming the scaled transform coefficients and the like may be based on the algorithm (or specification) of Table 32 as shown in FIGS. 27A-27D.

In an example, an example of assigning ctxInc to syntax elements including the context coded bins may be based on Table 33 below.

TABLE 33

9.5.4.2.1 of VVC spec
Table 9-15 - Assignment of ctxInc to syntax elements with context coded bins

| Syntax element | binIdx | | | | | |
| --- | --- | --- | --- | --- | --- | --- |
| | 0 | 1 | 2 | 3 | 4 | >=5 |
| intra_luma_ref_idx[ ][ ] | 0 | 1 | na | na | na | na |
| intra_subpartitions_mode_flag | 0 | na | na | na | na | na |
| intra_subpartition_split_flag | 0 | na | na | na | na | na |
| intra_luma_mpm_flag[ ][ ] | 0 | na | na | na | na | na |
| intra_planar_flag[ ][ ] | intra_luma_ref_idx! = 0? 2: (intra_subpartitions_mode_flag? 0: 1) | na | na | na | na | na |
| intra_luma_mpm_idx[ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag = = 0 | 0 | bypass | bypass | na | na | na |

Referring to Table 25, it may be confirmed that the intra_planar_flag is checked based on the check result that the value of the intra_luma_ref_idx is 0. The intra_luma_ref_idx may represent an example of the multi-reference line (MRL) index, and the intra_planar_flag may represent an example of the planar flag.

Referring to Table 27, it may be confirmed that the value of the context index (ctxInc or ctxIdx) for a bin related to intra_planar_flag is 0 or 1. That is, it may be confirmed that the value of the context index for the bin related to the intra_planar_flag may be one of two different integers.

Referring to Table 33, it may be confirmed that the context index for the bin related to the intra_planar_flag is based on the value of the intra_subpartitions_mode_flag. The intra_subpartitions_mode_flag may represent an example of an ISP flag indicating whether the intra sub partition (ISP) mode is applied to the current block.

Figure 11:
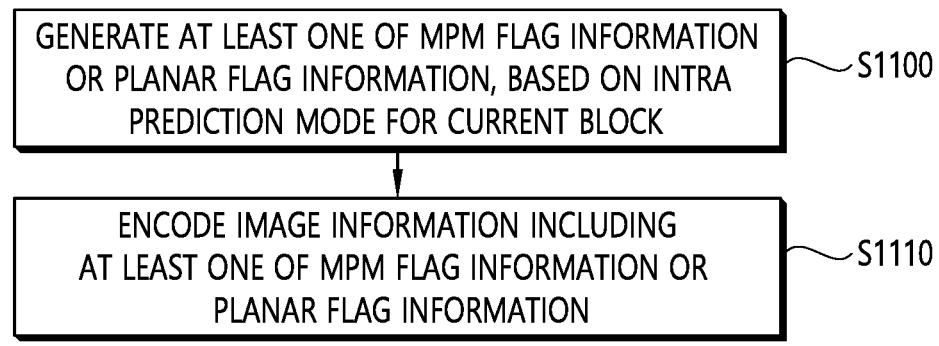
FIG. 11 is a flowchart illustrating an operation of the encoding apparatus according to an exemplary embodiment.
Figure 12:
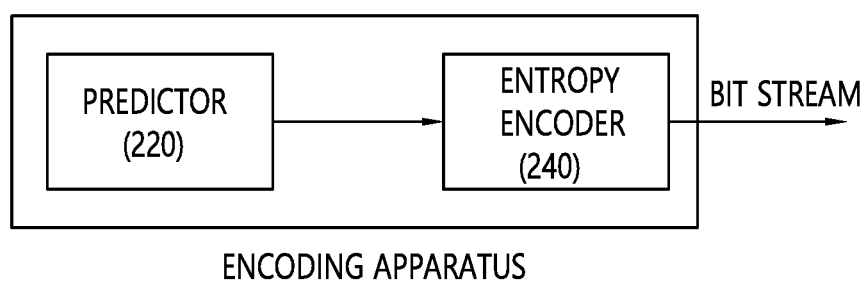
FIG. 12 is a block diagram illustrating a configuration of the encoding apparatus according to an exemplary embodiment.

FIG. 11 is a flowchart illustrating an operation of the encoding apparatus according to an exemplary embodiment, and FIG. 12 is a block diagram illustrating a configuration of an encoding apparatus according to an exemplary embodiment.

Figure 13:
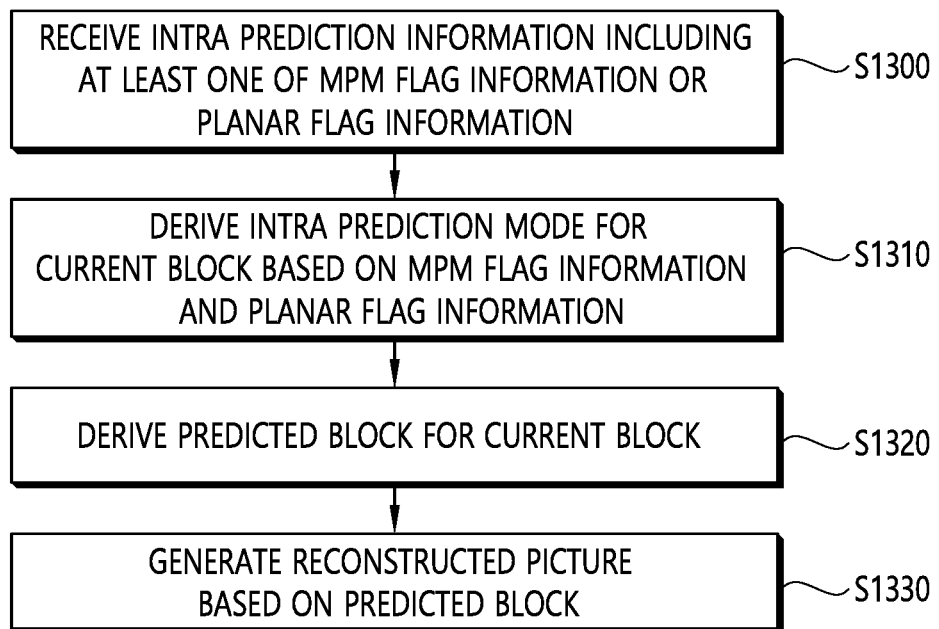
FIG. 13 is a flowchart illustrating an operation of the decoding apparatus according to an exemplary embodiment.
Figure 14:
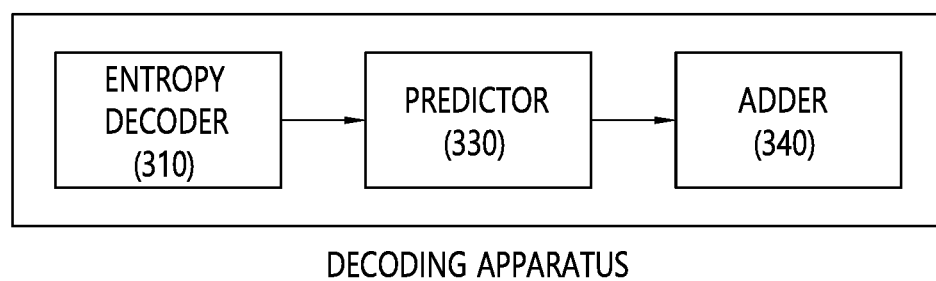
FIG. 14 is a block diagram illustrating a configuration of the decoding apparatus according to an exemplary embodiment.

The encoding apparatus according to FIGS. 11 and 12 may perform operations corresponding to the decoding apparatus according to FIGS. 13 and 14. Accordingly, the operations of the decoding apparatus to be described later with reference to FIGS. 13 and 14 may also be applied to the encoding apparatus according to FIGS. 11 and 12.

Each step illustrated in FIG. 11 may be performed by the encoding apparatus 200 illustrated in FIG. 2. Further, the operations according to S1100 and S1110 are based on some of the contents described with reference to FIGS. 4 to 10. Accordingly, detailed descriptions which overlap with those described above with reference to FIGS. 2 and 4 to 10 will be omitted or simplified.

As illustrated in FIG. 12, the encoding apparatus according to an exemplary embodiment may include a predictor 220 and an entropy encoder 240. However, in some cases, not all of the components illustrated in FIG. 12 may not be essential components of the encoding apparatus, and the encoding apparatus may be implemented by more or less components than the components illustrated in FIG. 12.

In the encoding apparatus according to an exemplary embodiment, the predictor 220 and the entropy encoder 240 may be implemented as separate chips, or at least two components may also be implemented through one chip.

The encoding apparatus according to an exemplary embodiment may generate at least one of MPM flag information representing whether to encode the intra prediction mode based on the MPM candidates for the current block or planar flag information representing whether to determine the intra prediction mode for the current block as the planar mode, based on the intra prediction mode for the current block (S1100).

For example, the encoding apparatus may derive an intra prediction mode for the current block, generate MPM flag information representing whether to encode the intra prediction mode based on MPM candidates for the current block, and generate the planar flag information based on the MPM representing that the MPM flag information is related to the planar flag information representing whether to determine the intra prediction mode for the current block as the planar mode.

The encoding apparatus according to an exemplary embodiment may encode image information including at least one of the MPM flag information or the planar flag information (S1110). More specifically, the entropy encoder 240 of the encoding apparatus may encode image information including at least one of the MPM flag information or the planar flag information.

In an exemplary embodiment, based on the case where the intra prediction mode for the current block is derived as the planar mode, the planar flag information may represent that the intra prediction mode for the current block is derived as the planar mode.

In an exemplary embodiment, the intra prediction information may further include MPM index information related to one of the MPM candidates other than the planar mode among the MPM candidates for the current block. The image encoding method may further include generating the MPM index information based on a case where the intra prediction mode for the current block is not derived as the planar mode.

In an exemplary embodiment, the total number of MPM candidates other than the planar mode among the MPM candidates for the current block may be equal to 5.

In an exemplary embodiment, the MPM index information includes a 0th MPM candidate, a 1st MPM candidate, a 2nd MPM candidate, a 3rd MPM candidate, or a 4th MPM candidate which is included in the MPM candidates other than the planar mode among the MPM candidates for the current block. Based on a case where the intra prediction mode of the left neighboring block of the current block and the intra prediction mode of the top neighboring block of the current block are the same and the intra prediction mode of the left neighboring block is greater than the intra DC mode, the intra prediction mode for the 0th MPM candidate may be the intra prediction mode of the left neighboring block of the current block, the intra prediction mode for the 1st MPM candidate may be 2+((intra prediction mode of the left neighboring block of the current block+61) %64), and the intra prediction mode for the 2nd MPM candidate may be 2+((intra prediction mode of the left neighboring block of the current block−1) %64).

In an exemplary embodiment, the MPM index information may represent the 0th MPM candidate, the 1st MPM candidate, the 2nd MPM candidate, the 3rd MPM candidate, or the 4th MPM candidate which is included in the MPM candidates other than the planar mode among the MPM candidates for the current block. Based on a case where the intra prediction mode of the left neighboring block of the current block and the intra prediction mode of the top neighboring block of the current block are not the same and the intra prediction mode of the left neighboring block is smaller than or equal to the intra DC mode, and the intra prediction mode of the top neighboring block is smaller than or equal to the intra DC mode, the intra prediction mode for the 0th MPM candidate may be the intra DC mode, the intra prediction mode for the 1st MPM candidate may be a 50th intra prediction mode, the intra prediction mode for the 2nd MPM candidate may be a 18th intra prediction mode, the intra prediction mode for the 3rd MPM candidate may be a 46th intra prediction mode, and the intra prediction mode for the 4th MPM candidate may be a 54th intra prediction mode.

In an exemplary embodiment, the MPM index information may be based on a truncated rice (TR) binarization process.

In an exemplary embodiment, the cMax representing the maximum value of the MPM index information may be equal to 4.

According to the encoding apparatus and the method for operating the encoding apparatus illustrated in FIGS. 11 and 12, the encoding apparatus may generate at least one of the MPM flag information representing whether to encode the intra prediction mode based on MPM candidates for the current block or the planar flag information representing whether to determine the intra prediction mode for the current block as the planar mode based on the intra prediction mode for the current block (S1100), and encode the image information including at least one of the MPM flag information or the planar flag information (S1110).

That is, the present disclosure may enhance image coding efficiency based on intra prediction using the MPM list for the current block. Alternatively, the present disclosure may enhance the efficiency of the intra prediction based on the MPM list based on the planar flag information representing whether to determine the intra prediction mode for the current block as the planar mode. Alternatively, the present disclosure may efficiently configure the MPM list for the current block. Alternatively, the present disclosure may efficiently code the MPM index.

FIG. 13 is a flowchart illustrating an operation of the decoding apparatus according to an exemplary embodiment, and FIG. 14 is a block diagram illustrating a configuration of the decoding apparatus according to an exemplary embodiment.

Each step illustrated in FIG. 13 may be performed by the decoding apparatus 300 illustrated in FIG. 3. Accordingly, detailed descriptions which overlap with the aforementioned contents will be omitted or simplified.

As illustrated in FIG. 14, the decoding apparatus according to an exemplary embodiment may include the entropy decoder 310, the predictor 330, and the adder 340. However, in some cases, all of the components illustrated in FIG. 14 may not be essential components of the decoding apparatus, and the decoding apparatus may be implemented by more or less components than the components illustrated in FIG. 14.

In the decoding apparatus according to an exemplary embodiment, the entropy decoder 310, the predictor 330, and the adder 340 may be implemented as separate chips, respectively, or at least two or more components may also be implemented through one chip.

The decoding apparatus according to an exemplary embodiment may receive the intra prediction information including at least one of the MPM flag information representing whether to derive the intra prediction mode for the current block based on the most probable mode (MPM) candidates for the current block or the planar flag information representing whether to determine the intra prediction mode for the current block as the planar mode most probable mode (S1300).

In an example, the intra prediction information may be included in the coding unit syntax.

In an example, the MPM flag information may be represented as intra_luma_mpm_flag, and the planar flag information may be represented as intra_luma_not_planar_flag. If the value of the intra_luma_not_planar_flag is 1, it may be determined that the intra prediction mode for the current block is not the planar mode, and if the value of the intra_luma_not_planar_flag is 0, it may be determined that the intra prediction mode for the current block is the planar mode.

In another example, the planar flag information may also be represented as intra_luma_planar_flag or intra_planar_flag. If the value of the intra_luma_planar_flag is 1, it may be determined that the intra prediction mode for the current block is the planar mode, and if the value of the intra_luma_planar_flag is 0, it may be determined that the intra prediction mode for the current block is not the planar mode.

In an example, the decoding apparatus may determine that the value of the MPM flag information is related to decoding the planar flag information, based on the determination that the value of the MPM flag information is 1. That is, the decoding apparatus may decode the planar flag information based on the determination that the value of the MPM flag information is 1.

The decoding apparatus according to an exemplary embodiment may derive the intra prediction mode for the current block based on the MPM flag information and the planar flag information (S1310).

The decoding apparatus according to an exemplary embodiment may derive a predicted block for the current block based on the intra prediction mode for the current block (S1320).

The decoding apparatus according to an exemplary embodiment may generate a reconstructed picture based on the predicted block (S1330).

In an exemplary embodiment, the planar flag information may be included in the intra prediction information, based on the case where the MPM flag information represents that the intra prediction mode for the current block is derived based on the MPM candidates.

In an exemplary embodiment, the deriving of the intra prediction mode for the current block may include deriving the intra prediction mode for the current block as the planar mode, based on a case where the planar flag information represents that the intra prediction mode for the current block is derived as the planar mode.

In an exemplary embodiment, the intra prediction information may further include MPM index information related to one of the MPM candidates other than the planar mode among the MPM candidates for the current block. The MPM index information may be included in the intra prediction information based on a case where the planar flag information represents that the intra prediction mode for the current block is not derived as the planar mode. The image decoding method is characterized in that the intra prediction mode for the current block is derived based on the MPM index information. In an example, the decoding apparatus may check the MPM index information based on the check result that the value of intra_luma_not_planar_flag is 1.

In an exemplary embodiment, the number of MPM candidates other than the planar mode among the MPM candidates for the current block may be equal to 5. In an example, the MPM candidates may include the 1st to 5th MPM candidates. The 1st MPM candidate may be related to an MPM index 0, the 2nd MPM candidate may be related to an MPM index 1, the 3rd MPM candidate may be related to an MPM index 2, the 4th MPM candidate may be related to an MPM index 3, and the 5th MPM candidate may be related to an MPM index 4.

In an exemplary embodiment, the MPM index information may represent the 0th MPM candidate, the 1st MPM candidate, the 2nd MPM candidate, the 3rd MPM candidate, or the 4th MPM candidate which is included in the MPM candidates other than the planar mode among the MPM candidates for the current block. In an example, based on a case where the intra prediction mode of the left neighboring block of the current block is the same as the intra prediction mode of the top neighboring block of the current block, and the intra prediction mode of the left neighboring block is larger than the intra DC mode, the intra prediction mode for the 0th MPM candidate may be the intra prediction mode of the left neighboring block of the current block, the intra prediction mode for the 1st MPM candidate may be 2+((the intra prediction of the left neighboring block of the current block)+61)%64), and the intra prediction mode for the 2nd MPM candidate may be 2+((the intra prediction mode of the left neighboring block of the current block−1)% 64).

In an example, the MPM index information may be represented as intra_luma_mpm_idx, and the 0th MPM candidate to the 4th MPM candidate corresponding to the MPM index 0 to the MPM index 4 may be represented as candModeList [0], candModeList [1], candModeList [2], candModeList [3], and candModeList [4], respectively.

In an example, if the intra prediction mode for the left neighboring block of the current block is candIntraPredModeA, the intra prediction mode for the top neighboring block of the current block is candIntraPredModeB, candIntraPredModeA, and candIntraPredModeB are the same, and the candIntraPredModeA is larger than INTRA_DC, the 0th MPM candidate, the 1st MPM candidate, and the 2nd MPM candidate among the MPM candidates configuring the MPM list may be determined as follows.

candModeList[0]=candIntraPredModeA candModeList[1]=2+((candIntraPredModeA+61)%64)

candModeList[2]=2+((candIntraPredModeA−1)%64)   Equation 1

In another example, based on a case where the intra prediction mode of the left neighboring block of the current block and the intra prediction mode of the top neighboring block of the current block are not the same, the intra prediction mode of the left neighboring block is smaller than or equal to the intra DC mode, and the intra prediction mode of the top neighboring block is smaller than or equal to the intra DC mode, the intra prediction mode for the 0th MPM candidate may be the intra DC mode, the intra prediction mode for the 1st MPM candidate may be the 50th intra prediction mode, the intra prediction mode for the 2nd MPM candidate may be the 18th intra prediction mode, the intra prediction mode for the 3rd MPM candidate may be the 46th intra prediction mode, and the intra prediction mode for the 4th MPM candidate may be the 54th intra prediction mode.

In an exemplary embodiment, the MPM index information may be based on a truncated rice (TR) binarization process.

In an exemplary embodiment, cMax indicating the maximum value of the MPM index information may be equal to 4.

According to the decoding apparatus and the method for operating the decoding apparatus illustrated in FIGS. 13 and 14, the decoding apparatus may receive intra prediction information including at least one of MPM flag information representing whether to derive an intra prediction mode for the current block based on most probable mode (MPM) candidates for the current block or planar flag information representing whether to determine the intra prediction mode for the current block as a planar mode (S1300), derive the intra prediction mode for the current block based on the MPM flag information and the planar flag information (S1310), derive a predicted block for the current block based on the intra prediction mode for the current block (S1320), and generate a reconstructed picture based on the predicted block (S1330). At this time, based on a case where the MPM flag information represents that the intra prediction mode for the current block is derived based on the MPM candidates, the planar flag information may be included in the intra prediction information.

That is, the present disclosure may enhance the efficiency of the intra prediction based on the MPM list based on the planar flag information representing whether to determine the intra prediction mode for the current block as the planar mode. Alternatively, the present disclosure may enhance the image coding efficiency by determining whether to signal the planar flag information based on the MRL index information. Alternatively, the present disclosure may efficiently configure the MPM list for the current block. Alternatively, the present disclosure may determine the value of the context index for the bin related to the planar flag information based on whether the ISP mode is applied to the current block.

In the aforementioned embodiments, while the methods are described based on the flowcharts shown as a series of steps or blocks, the present disclosure is not limited to the order of steps, and a certain step may occur in a different order from or simultaneously with a step different from that described above. Further, those skilled in the art will understand that the steps shown in the flowchart are not exclusive, and other steps may be included or one or more steps in the flowcharts may be deleted without affecting the scope of the present disclosure.

The aforementioned method according to the present disclosure may be implemented in the form of software, and the encoding apparatus and/or the decoding apparatus according to the present disclosure may be included in the apparatus for performing image processing of, for example, a TV, a computer, a smartphone, a set-top box, a display device, and the like.

When the embodiments in the present disclosure are implemented in software, the aforementioned method may be implemented as a module (process, function, and the like) for performing the aforementioned function. The module may be stored in a memory, and executed by a processor. The memory may be located inside or outside the processor, and may be coupled with the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium and/or other storage devices. That is, the embodiments described in the present disclosure may be performed by being implemented on a processor, a microprocessor, a controller, or a chip. For example, the functional units illustrated in each drawing may be performed by being implemented on the computer, the processor, the microprocessor, the controller, or the chip. In this case, information for implementation (for example, information on instructions) or algorithm may be stored in a digital storage medium.

Further, the decoding apparatus and the encoding apparatus to which the present disclosure is applied may be included in a multimedia broadcast transceiver, a mobile communication terminal, a home cinema video device, a digital cinema video device, a surveillance camera, a video communication device, a real-time communication device such as video communication, a mobile streaming device, a storage medium, a camcorder, a Video on Demand (VoD) service provider, an Over the top video (OTT video) device, an Internet streaming service provider, a three-dimensional (3D) video device, a virtual reality (VR) device, an augmented reality (AR) device, a video telephony video device, a transportation terminal (for example, vehicle (including autonomous vehicle) terminal, airplane terminal, ship terminal, or the like), and a medical video device, and the like, and may be used to process video signals or data signals. For example, the OTT video device may include a game console, a Blu-ray player, an Internet-connected TV, a home theater system, a smartphone, a tablet PC, a Digital Video Recorder (DVR), and the like.

Further, the processing method to which the present disclosure is applied may be produced in the form of a program executed by a computer, and may be stored in a computer readable recording medium. The multimedia data having a data structure according to the present disclosure may also be stored in the computer readable recording medium. The computer readable recording medium includes all kinds of storage devices and distributed storage devices in which computer readable data are stored. The computer readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk, and an optical data storage device. Further, the computer readable recording medium includes media implemented in the form of a carrier wave (for example, transmission via the Internet). Further, the bitstream generated by the encoding method may be stored in the computer readable recording medium or transmitted through wired/wireless communication networks.

Further, the embodiments of the present disclosure may be implemented as a computer program product by a program code, and the program code may be executed on the computer according to the embodiments of the present disclosure. The program code may be stored on a computer readable carrier.

This document relates to video/image coding. For example, a method/embodiment disclosed in this document may be applied to a method disclosed in versatile video coding (VVC) standard, essential video coding (EVC) standard, AOMedia Video 1 (AV1) standard, 2nd generation of audio video coding standard (AVS2) or next generation video/image coding standard (e.g., H.267, H.268, or the like).

In this document, a variety of embodiments relating to video/image coding may be provided, and, unless specified to the contrary, the embodiments may be combined to each other and be performed.

In this document, a video may refer to a series of images over time. A picture generally refers to the unit representing one image at a particular time frame, and a slice/tile refers to the unit constituting the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specified sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In this document, a tile group and a slice may be used interchangeably. For example, in this document, a tile group/tile group header may also be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "AB/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 15:
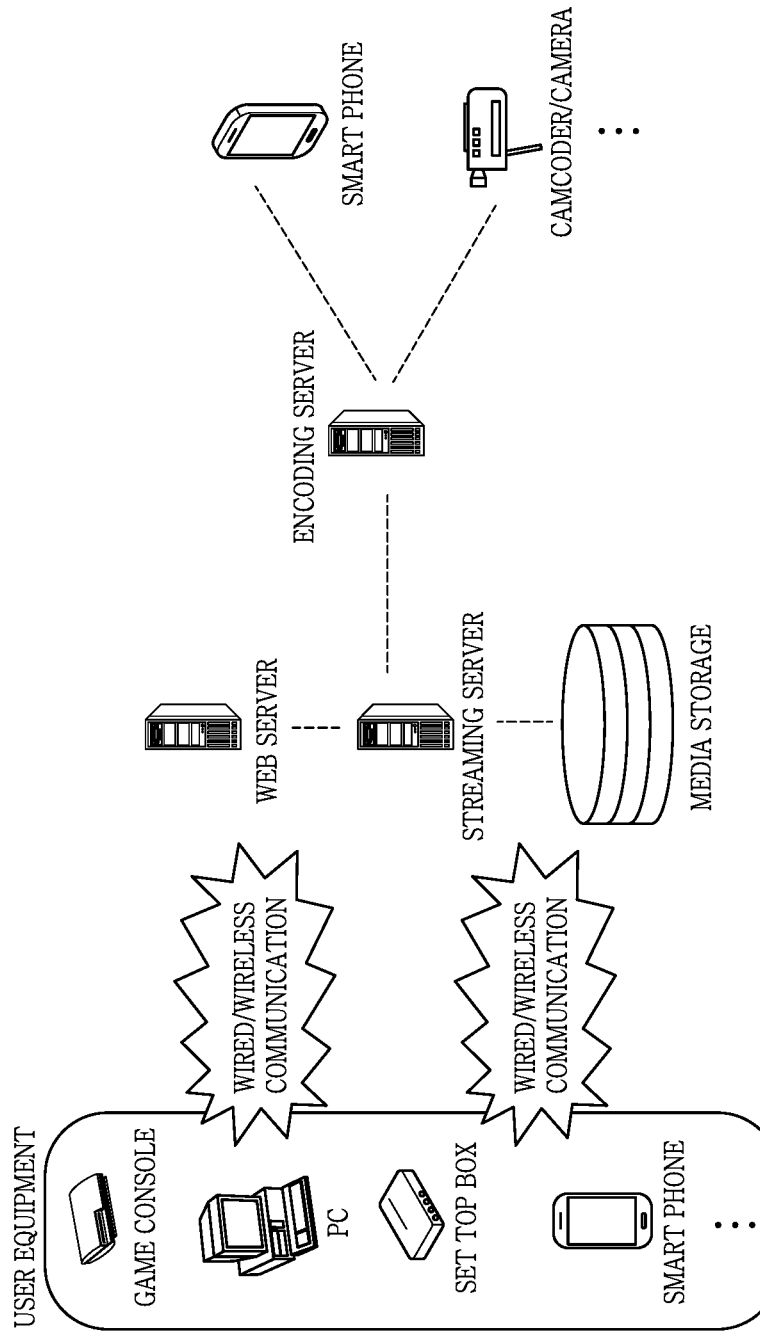
FIG. 15 is a diagram illustrating an example of a content streaming system to which the disclosure of the present document may be applied.

FIG. 15 represents an example of a content streaming system to which the disclosure of the present document may be applied.

Referring to FIG. 15, the content streaming system to which the present disclosure is applied may largely include an encoding server, a streaming server, a web server, a media storage, a user device, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the smart phone, the camera, the camcoder or the like directly generates a bitstream, the encoding server may be omitted.

The bitstream may be generated by an encoding method or a bitstream generation method to which the present disclosure is applied. And the streaming server may temporarily store the bitstream in a process for transmitting or receiving the bitstream.

The streaming server transmits multimedia data to the user equipment based on a user's request through the web server, which functions as an instrument that informs a user of what service there is. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be distributedly processed.

What is claimed is:

1. An image decoding method performed by a decoding apparatus, the method comprising:
    receiving intra prediction information comprising most probable mode (MPM) flag information related to whether to derive an intra prediction mode for a current block based on MPM candidates for the current block, planar flag information related to whether to determine the intra prediction mode for the current block as a planar mode, and MPM index information related to one of 5 MPM candidates other than the planar mode among the MPM candidates for the current block;
    deriving the intra prediction mode for the current block based on at least one of a value of the MPM flag information, a value of the planar flag information, or a value of the MPM index information;
    deriving a predicted block for the current block based on the intra prediction mode for the current block; and
    generating a reconstructed picture based on the predicted block,
    wherein the MPM flag information is configured in a coding unit syntax for the current block,
    wherein based on the value of the MPM flag information representing that the intra prediction mode for the current block is derived based on the MPM candidates, the planar flag information is configured in the coding unit syntax, and
    wherein based on the value of the planar flag information representing that the intra prediction mode for the current block is not as the planar mode, the MPM index information is configured in the coding unit syntax.

2. The image decoding method of claim 1, wherein the deriving of the intra prediction mode for the current block comprises
    deriving the intra prediction mode for the current block as the planar mode, based on the planar flag information representing that the intra prediction mode for the current block is derived as the planar mode, and
    wherein the planar mode information is signaled between the MPM flag information and the MPM index information.

3. The image decoding method of claim 1, wherein the MPM index information represents a 0th MPM candidate, a 1st MPM candidate, a 2nd MPM candidate, a 3rd MPM candidate, or a 4th MPM candidate which is comprised in the MPM candidates other than the planar mode among the MPM candidates for the current block, and
    wherein based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate is the intra prediction mode of the left neighboring block of the current block, an intra prediction mode for the 1st MPM candidate is 2+((the intra prediction mode of the left neighboring block of the current block+61)%64), and an intra prediction mode for the 2nd MPM candidate is 2+((the intra prediction mode of the left neighboring block of the current block−1)%64).

4. The image decoding method of claim 1, wherein the MPM index information represents a 0th MPM candidate, a 1st MPM candidate, a 2nd MPM candidate, a 3rd MPM candidate, or a 4th MPM candidate which is comprised in the MPM candidates other than the planar mode among the MPM candidates for the current block, and
    wherein based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller than or equal to the intra DC mode, the intra prediction mode for the 0th MPM candidate is the intra DC mode, the intra prediction mode for the 1st MPM candidate is a 50th intra prediction mode, the intra prediction mode for the 2nd MPM candidate is a 18th intra prediction mode, the intra prediction mode for the 3rd MPM candidate is a 46th intra prediction mode, and the intra prediction mode for the 4th MPM candidate is a 54th intra prediction mode.

5. The image decoding method of claim 1, wherein the MPM index information is based on a truncated rice (TR) binarization process, and
cMax representing a maximum value of the MPM index information is equal to 4.

6. The image decoding method of claim 1, wherein the coding unit syntax includes intra subpartitions mode flag information related to whether the current block is partitioned into subpartitions,
wherein the value of the planar mode flag information is derived based on a context increment for a bin of the planar mode flag information, and
wherein the context increment for the bin of the planar mode flag information is determined based on a value of the intra subpartitions mode flag information.

7. The image decoding method of claim 6, wherein based on a value of the intra subpartitions mode flag information being equal to 1, the context increment for the bin of the planar mode flag information is determined as to be equal to 0, and
wherein based on a value of the intra subpartitions mode flag information being equal to 0, the context increment for the bin of the planar mode flag information is determined as to be equal to 1.

8. An image encoding method performed by an encoding apparatus, the method comprising:
deriving an intra prediction mode for a current block;
generating MPM flag information, planar flag information and MPM index information based on the derived intra prediction mode, wherein the MPM flag information is related to whether the intra prediction mode for the current block is derived based on most probable mode (MPM) candidates for the current block,
the planar flag information is related to whether to determine the intra prediction mode for the current block as a planar mode, and the MPM index information related to one of 5 MPM candidates other than the planar mode among the MPM candidates for the current block,
encoding image information comprising the MPM flag information, the planar flag information and the MPM index information,
wherein the MPM flag information is configured in a coding unit syntax for the current block,
wherein based on a value of the MPM flag information representing that the intra prediction mode for the current block is derived based on the MPM candidates, the planar flag information is configured in the coding unit syntax, and
wherein based on a value of the planar flag information representing that the intra prediction mode for the current block is not as the planar mode, the MPM index information is configured in the coding unit syntax.

9. The image encoding method of claim 8, wherein based on the case where the intra prediction mode for the current block is derived as the planar mode, the planar flag information represents that the intra prediction mode for the current block is derived as the planar mode, and
wherein the planar mode information is signaled between the MPM flag information and the MPM index information.

10. The image encoding method of claim 8, wherein the MPM index information represents a 0th MPM candidate, a 1st MPM candidate, a 2nd MPM candidate, a 3rd MPM candidate, or a 4th MPM candidate which is comprised in the MPM candidates other than the planar mode among the MPM candidates for the current block, and
wherein based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate is the intra prediction mode of the left neighboring block of the current block, an intra prediction mode for the 1st MPM candidate is 2+((the intra prediction mode of the left neighboring block of the current block+61)%64), and an intra prediction mode for the 2nd MPM candidate is 2+((the intra prediction mode of the left neighboring block of the current block−1)%64).

11. The image encoding method of claim 8, wherein the MPM index information represents a 0th MPM candidate, a 1st MPM candidate, a 2nd MPM candidate, a 3rd MPM candidate, or a 4th MPM candidate which is comprised in the MPM candidates other than the planar mode among the MPM candidates for the current block, and
wherein based on a case where an intra prediction mode of a left neighboring block of the current block and an intra prediction mode of a top neighboring block of the current block are not the same, the intra prediction mode of the left neighboring block is smaller than or equal to an intra DC mode, and the intra prediction mode of the top neighboring block is smaller than or equal to the intra DC mode, the intra prediction mode for the 0th MPM candidate is the intra DC mode, the intra prediction mode for the 1st MPM candidate is a 50th intra prediction mode, the intra prediction mode for the 2nd MPM candidate is a 18th intra prediction mode, the intra prediction mode for the 3rd MPM candidate is a 46th intra prediction mode, and the intra prediction mode for the 4th MPM candidate is a 54th intra prediction mode.

12. The image encoding method of claim 8, wherein the MPM index information is based on a truncated rice (TR) binarization process, and
cMax representing a maximum value of the MPM index information is equal to 4.

13. The image encoding method of claim 8, wherein the coding unit syntax includes intra subpartitions mode flag information related to whether the current block is partitioned into subpartitions,
wherein the value of the planar mode flag information is derived based on a context increment for a bin of the planar mode flag information, and
wherein the context increment for the bin of the planar mode flag information is determined based on a value of the intra subpartitions mode flag information.

14. The image encoding method of claim 13, wherein based on a value of the intra subpartitions mode flag information being equal to 1, the context increment for the bin of the planar mode flag information is determined as to be equal to 0, and
wherein based on a value of the intra subpartitions mode flag information being equal to 0, the context increment for the bin of the planar mode flag information is determined as to be equal to 1.

15. A non-transitory computer readable storage medium comprising:
encoded information which causes a decoding apparatus to perform an image decoding method,
wherein the image decoding method comprises
obtaining intra prediction information comprising most probable mode (MPM) flag information related to whether to derive an intra prediction mode for a current block based on most probable mode (MPM) candidates for the current block, planar flag information representing whether to determine the intra prediction mode for the current block as a planar mode, and MPM index information related to one of 5 MPM candidates other than the planar mode among the MPM candidates for the current block;

deriving the intra prediction mode for the current block based on at least one of a value of the MPM flag information, a value of the planar flag information or a value the MPM index information;

deriving a predicted block for the current block based on the intra prediction mode for the current block; and generating a reconstructed picture based on the predicted block, and wherein the MPM flag information is configured in a coding unit syntax for the current block, wherein based on the value of the MPM flag information representing that the intra prediction mode for the current block is derived based on the MPM candidates, the planar flag information is configured in the coding unit syntax, and wherein based on the value of the planar flag information representing that the intra prediction mode for the current block is not as the planar mode, the MPM index information is configured in the coding unit syntax.

16. The non-transitory computer readable storage medium of claim 15, wherein the MPM index information represents a 0th MPM candidate, a 1st MPM candidate, a 2nd MPM candidate, a 3rd MPM candidate, or a 4th MPM candidate which is comprised in the MPM candidates other than the planar mode among the MPM candidates for the current block, and wherein based on a case where an intra prediction mode of a left neighboring block of the current block and an intra prediction mode of a top neighboring block of the current block are the same and the intra prediction mode of the left neighboring block is larger than an intra DC mode, an intra prediction mode for the 0th MPM candidate is the intra prediction mode of the left neighboring block of the current block, an intra prediction mode for the 1st MPM candidate is 2+((the intra prediction mode of the left neighboring block of the current block+61)%64), and an intra prediction mode for the 2nd MPM candidate is 2+((the intra prediction mode of the left neighboring block of the current block−1)%64).

17. The non-transitory computer readable storage medium of claim 15, wherein the MPM index information is based on a truncated rice (TR) binarization process, and cMax representing a maximum value of the MPM index information is equal to 4.

18. The non-transitory computer readable storage medium of claim 15, wherein the planar mode information is signaled between the MPM flag information and the MPM index information.

19. The non-transitory computer readable storage medium of claim 15, wherein the coding unit syntax includes intra subpartitions mode flag information related to whether the current block is partitioned into subpartitions, wherein the value of the planar mode flag information is derived based on a context increment for a bin of the planar mode flag information, and wherein the context increment for the bin of the planar mode flag information is determined based on a value of the intra subpartitions mode flag information.

20. The non-transitory computer readable storage medium of claim 19, wherein based on a value of the intra subpartitions mode flag information being equal to 1, the context increment for the bin of the planar mode flag information is determined as to be equal to 0, and wherein based on a value of the intra subpartitions mode flag information being equal to 0, the context increment for the bin of the planar mode flag information is determined as to be equal to 1.

* * * * *